United States Patent

Benware

[15] 3,642,248
[45] Feb. 15, 1972

[54] SEALING MECHANISM

[72] Inventor: Robert Edgar Benware, Pawcatuck, Conn.
[73] Assignees: Allen & Company FOF Proprietary Funds Ltd.; Robin Harkas; William Stix Wasserman
[22] Filed: May 7, 1969
[21] Appl. No.: 822,593

Related U.S. Application Data

[63] Continuation-in-part of Ser. No. 568,715, July 6, 1966, abandoned, and a continuation-in-part of 646,149, June 9, 1967.

[52] U.S. Cl............................251/172, 251/174, 251/175, 251/176
[51] Int. Cl........................................F16k 3/10, F16k 5/14
[58] Field of Search..................251/172, 174, 175, 176, 326, 251/183, 194, 306; 137/246.22

[56] References Cited

UNITED STATES PATENTS

| | | | |
|---|---|---|---|
| 2,109,042 | 2/1938 | Bennett | 251/326 X |
| 2,349,170 | 5/1944 | Jackman | 251/DIG. 1 |
| 2,585,556 | 2/1952 | Johnson | 251/DIG. 1 |
| 2,889,134 | 6/1959 | Bryant | 251/328 X |
| 2,938,704 | 5/1960 | Quail | 251/172 |
| 3,160,387 | 12/1964 | Windsor | 251/172 |
| 3,166,291 | 1/1965 | Grove | 251/174 X |
| 3,409,269 | 5/1968 | Fawkes | 251/306 X |

FOREIGN PATENTS OR APPLICATIONS 616,199   3/1961   Canada..........................251/DIG. 1

*Primary Examiner*—Clarence R. Gordon
*Attorney*—Kenyon and Kenyon Reilly Carr & Chapin

[57] ABSTRACT

This disclosure is directed to a sealing machine for sealing a first member and a second member against the flow of system pressure. In this mechanism a wear ring is used which is comprised of a seating surface and a flange area which cooperates with the flanges of a groove located in the first member to lock said wear ring in said groove. A backing ring is generally disposed in said groove, beneath the wear ring and is locked within said groove by said wear ring. The backing ring serves to force or preload said seating surface of said wear ring against said second member when the sealing mechanism is closed. The backing ring may be eliminated in an embodiment of the invention wherein the wear ring is so adapted to provide its own preloading force and the additional preload of the backing ring is not needed. In one embodiment of the invention the backing ring acts as a seal against system pressure trying to leak under and around said wear ring. Furthermore, provision is made to communicate system pressure into said groove behind said wear ring to aid the backing ring in urging said wear ring against said second member. The backing ring preload and the system pressure communicated into said groove combine to create a piston action on the widest part of said wear ring which causes to amplified force on the narrower seating surface which is in contact with the second member.

38 Claims, 42 Drawing Figures

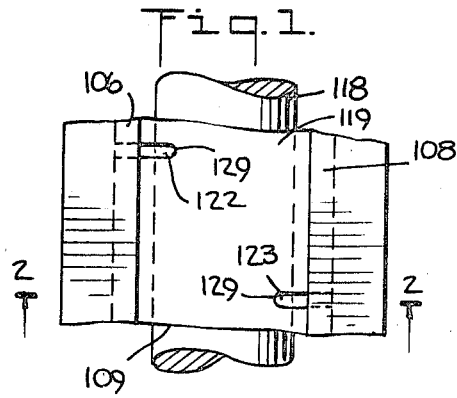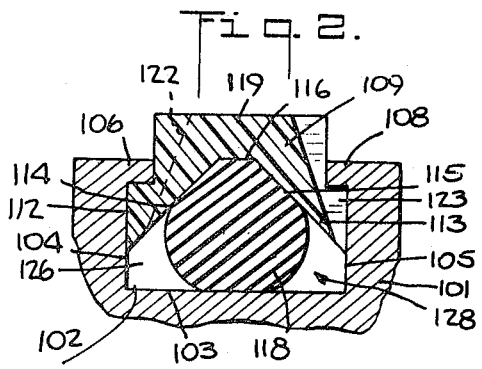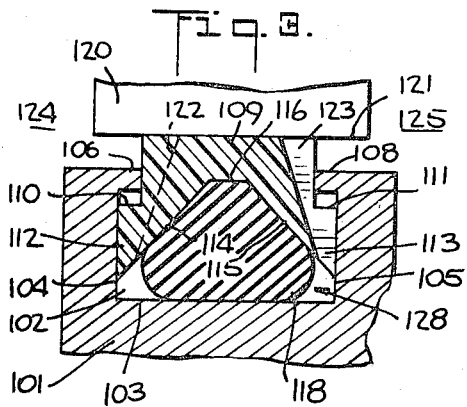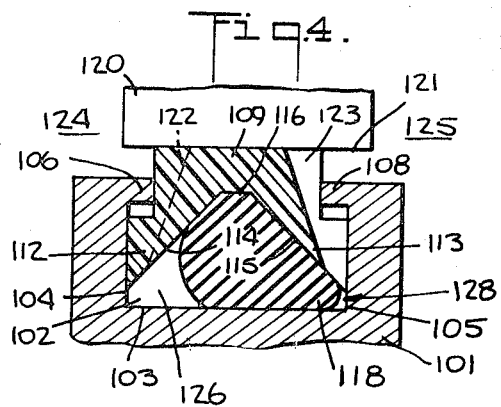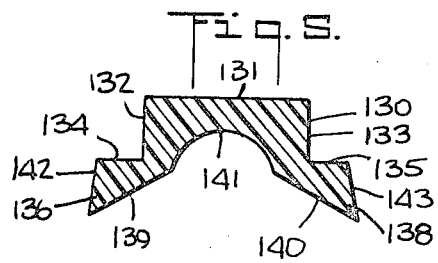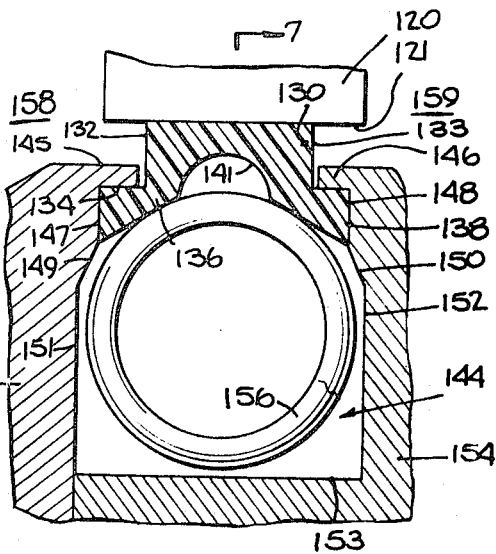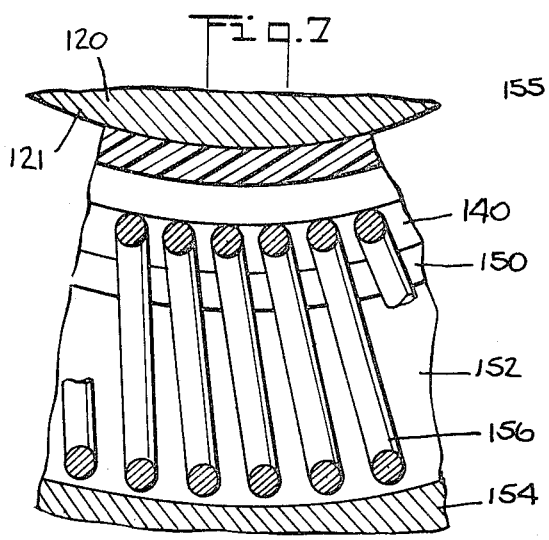

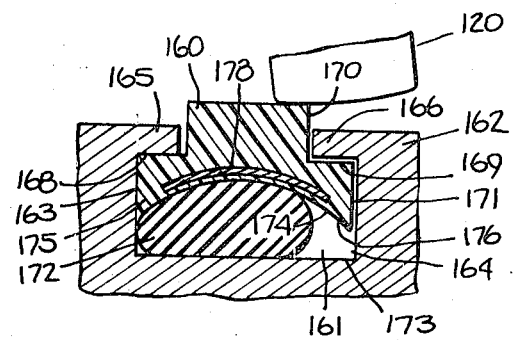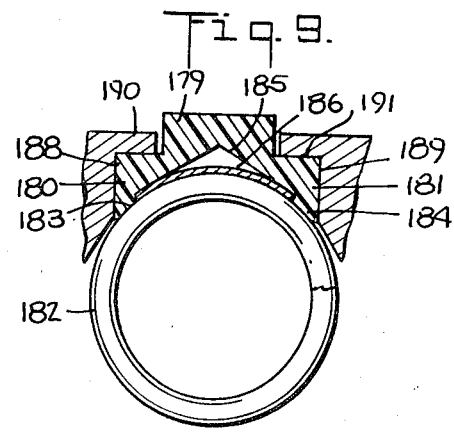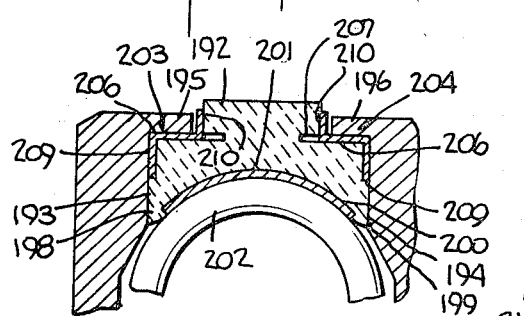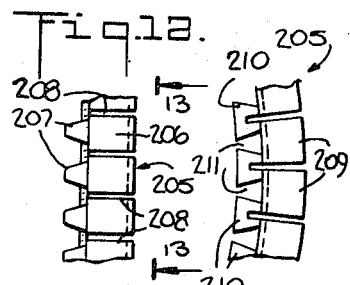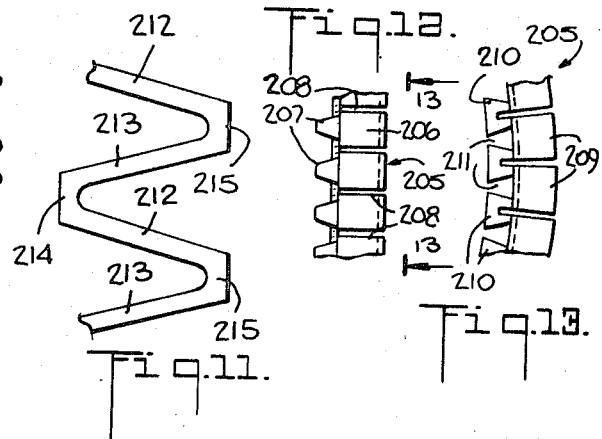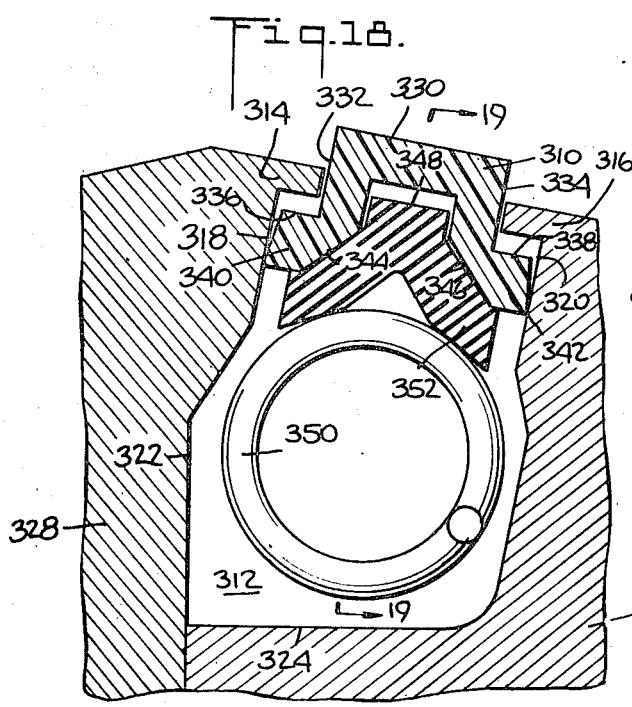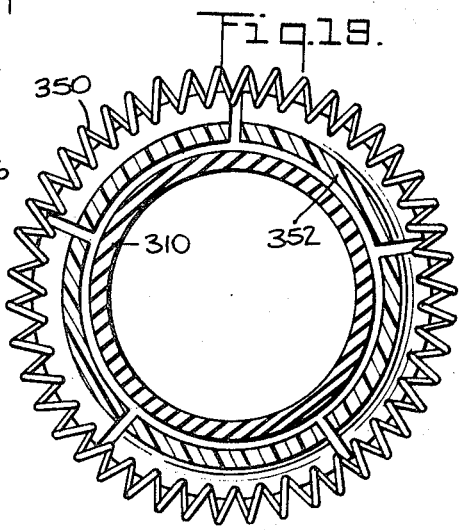
INVENTOR.
ROBERT EDGAR BENWARE
BY
Kenyon & Kenyon
ATTORNEYS INVENTOR.
ROBERT EDGAR BENWARE
BY
Kenyon & Kenyon
ATTORNEYS INVENTOR.
ROBERT EDGAR BENWARE
BY
Kenyon & Kenyon
ATTORNEYS

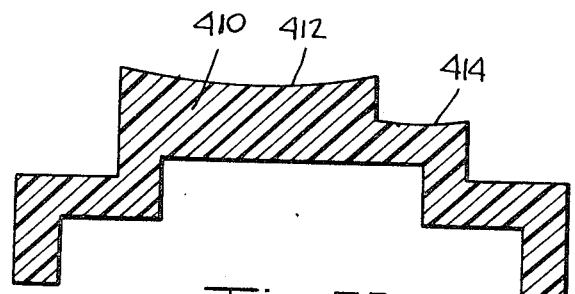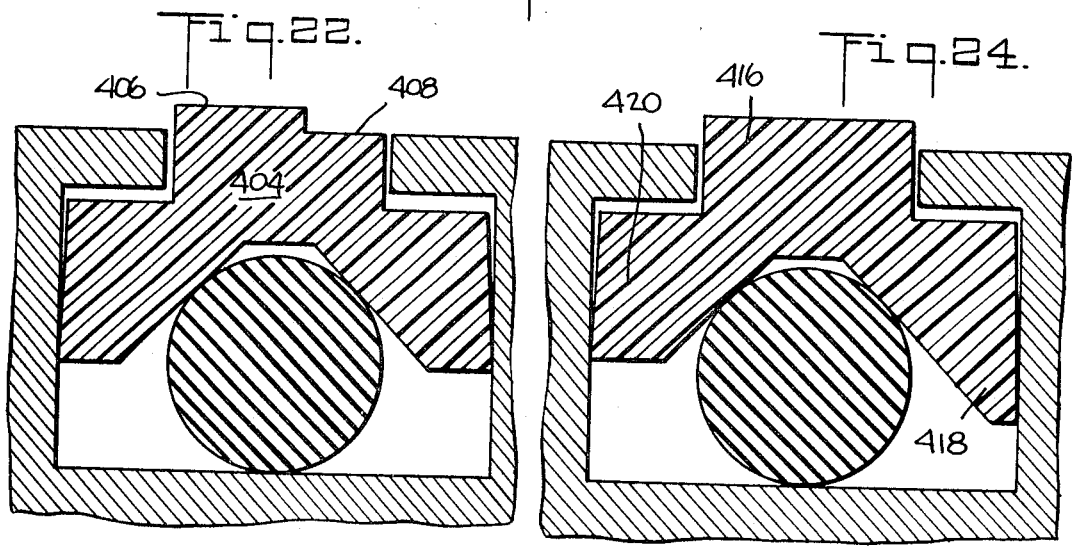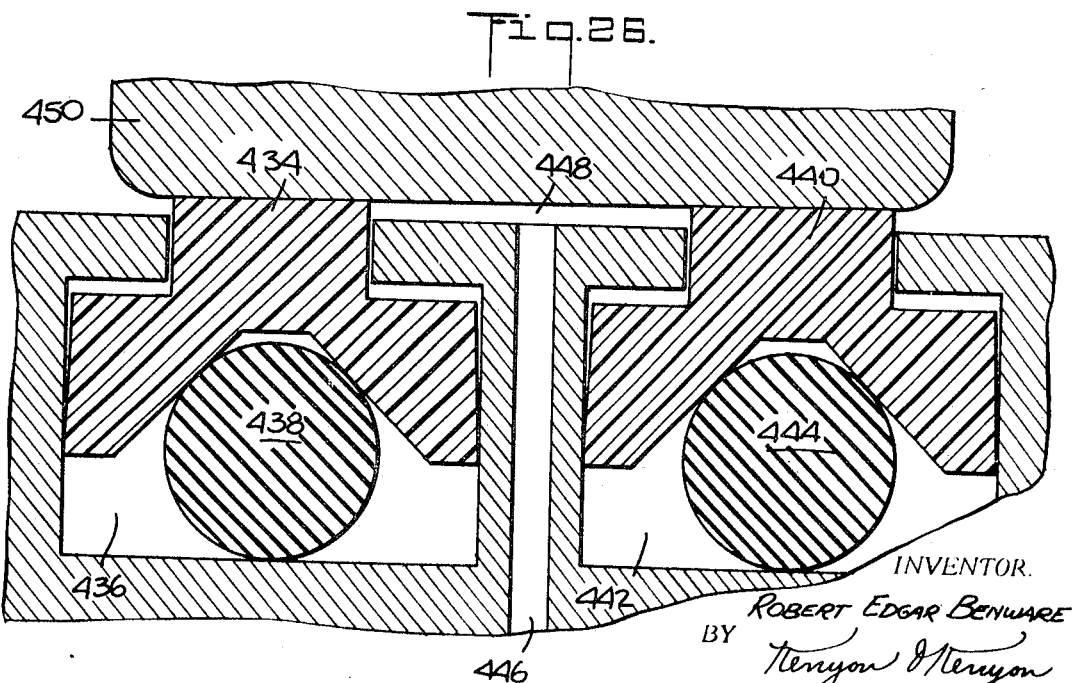

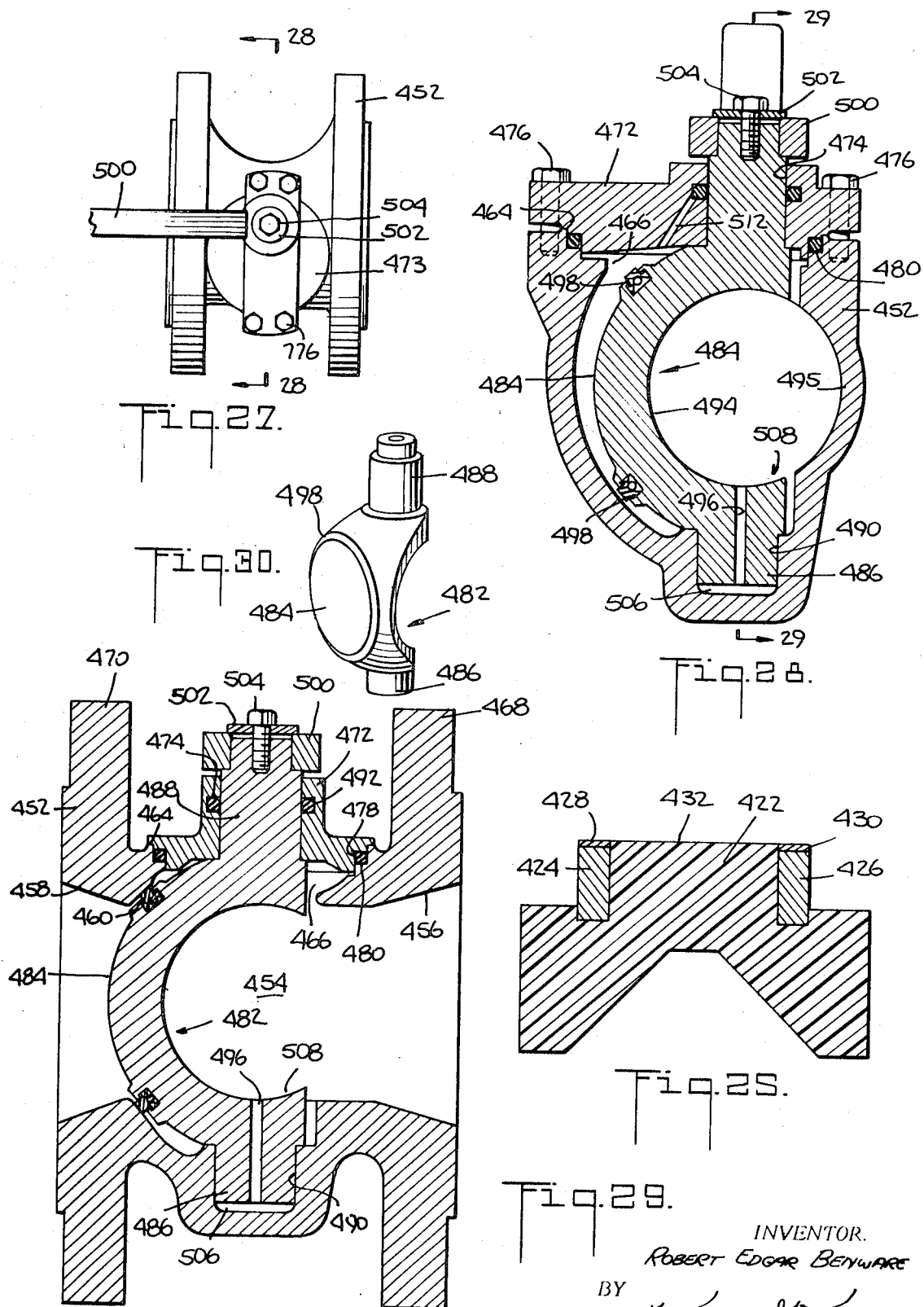

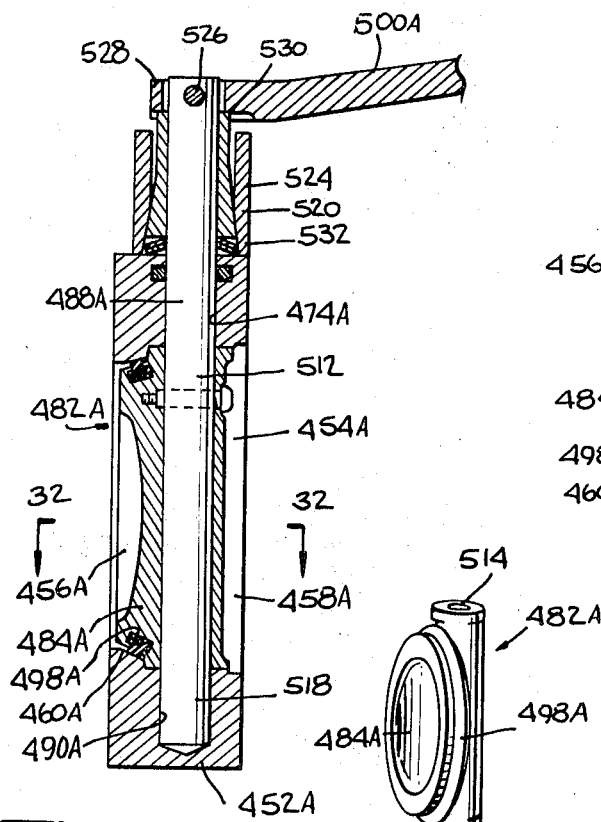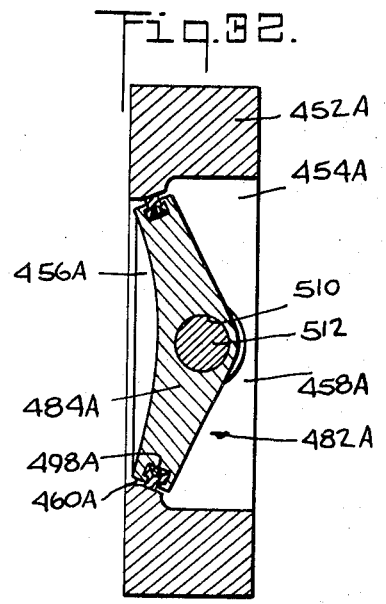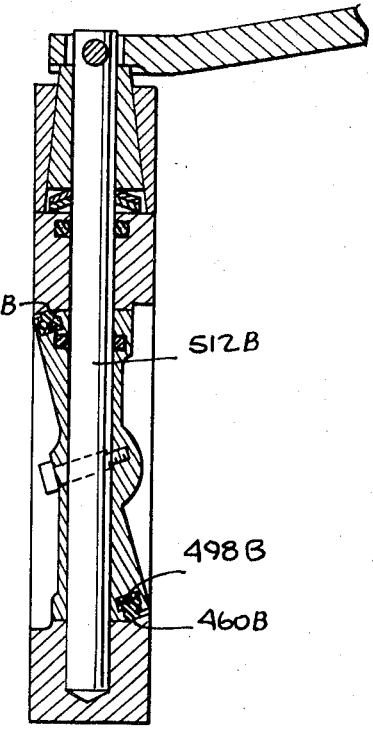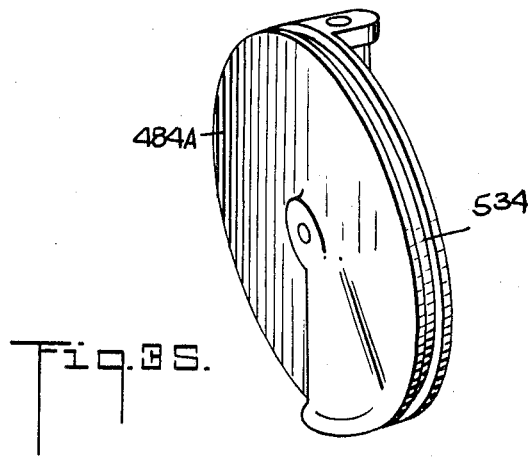

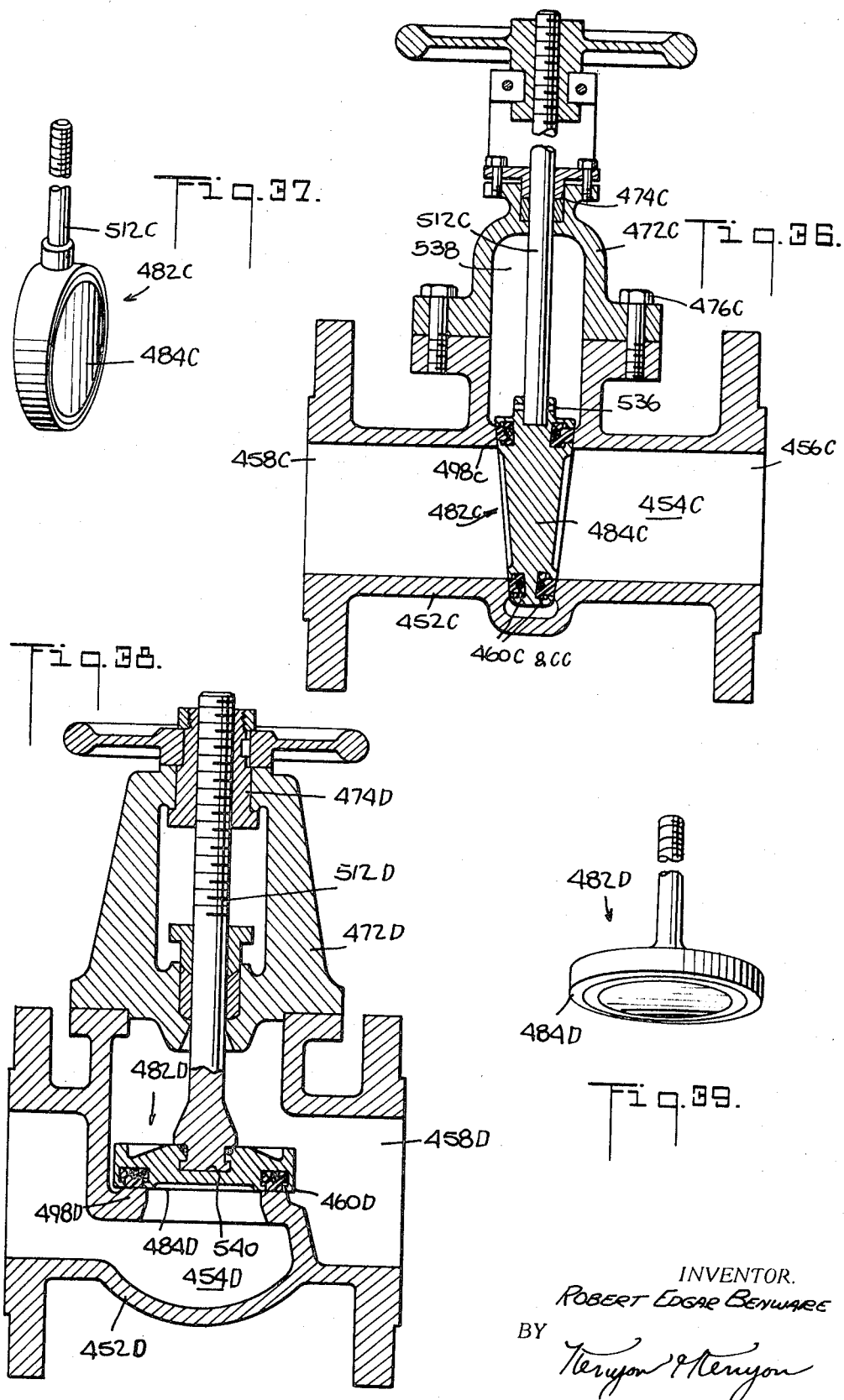

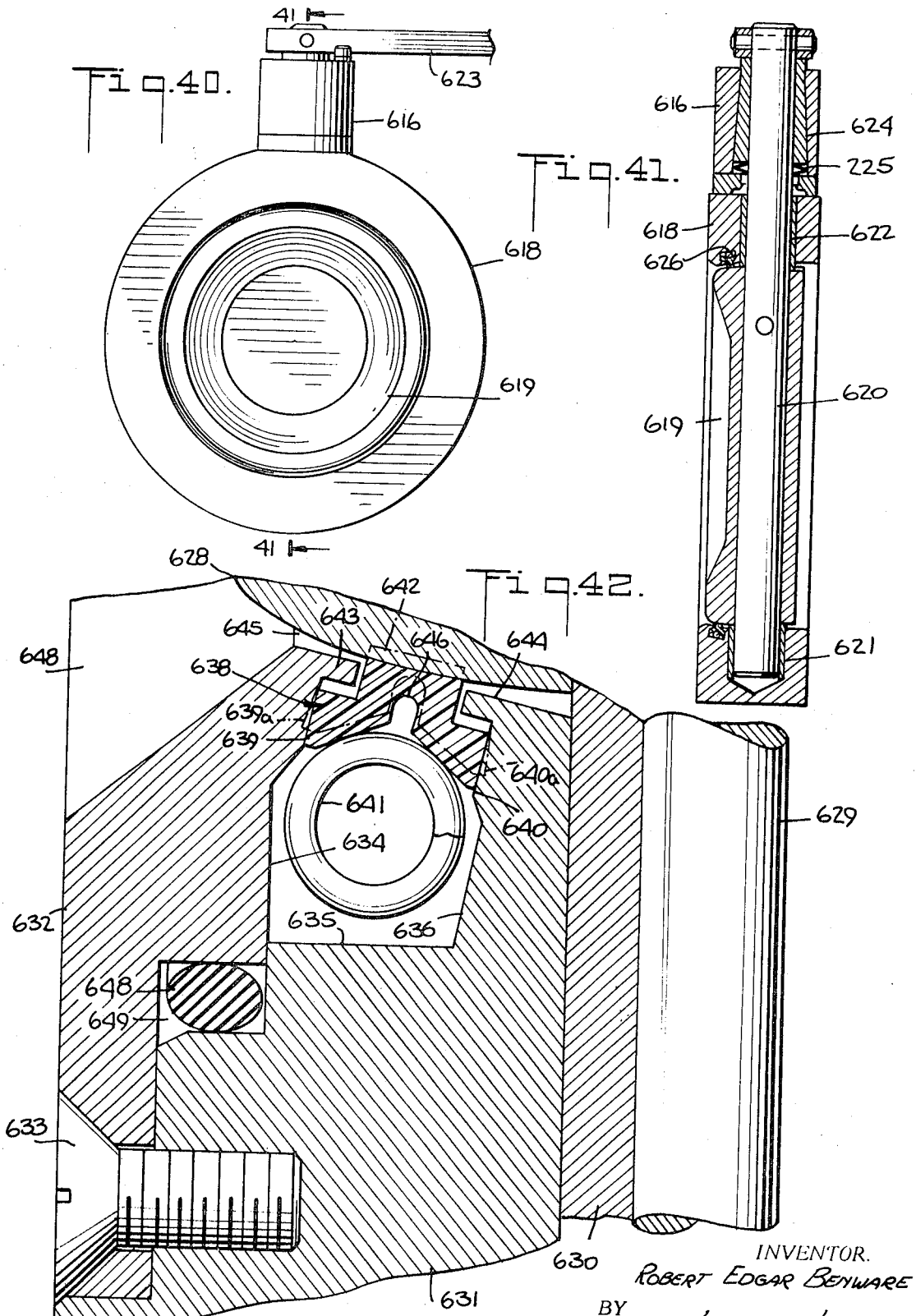

SEALING MECHANISM

CROSS-REFERENCES TO RELATED APPLICATIONS

This application is a continuation-in-part of my subsequently abandoned applications Ser. No. 568,715 filed July 6, 1966 and Ser. No. 646,149 filed June 9, 1967. Said latter application was a continuation-in-part of the former.

BACKGROUND OF THE INVENTION

1. Field of the Invention

This invention relates to sealing mechanisms, wherein a sealing material which is disposed between the sealing mechanism parts is confined within a groove or other chamber located in one of said parts and which are employed in pressurized liquid and gaseous systems when it is desired to permit or restrict the flow of system pressure from one portion of the system to a second portion of the system.

2. Description of the Prior Art

It is conventional practice to seal adjacent surfaces against fluid flow therebetween by means of a resilient member positioned between and in engagement with each of said surfaces. It is also conventional practice to provide a groove in one of said surfaces to house the resilient member and thus retain said resilient member against undesirable displacement or removal from its position while it fulfills its sealing function, i.e., when the sealing mechanism is in a closed position.

For example, an annular resilient member or sealing ring may be provided in a groove provided in the housing of a butterfly valve. This member will engage the circumferential periphery of the valve disc to create a seal against fluid flow when the valve disc is in its closed position.

However, conventional equipment of this kind frequently suffers from a variety of difficulties. For instance, where pressures are high, there is a tendency to cause blowout, i.e., dislocation of the seal from its groove, especially when the valve disc ceases to be in a closed position. When such blowout occurs, the valve is rendered inoperative because the seal can no longer fulfill its sealing function. This, in turn, causes leaks which result in a costly shutdown of the valve and associated portions of the system with which it is used, and may require repair and replacement of the seal and other portions of the system.

When high pressures are encountered, a correspondingly great torque is often required to move the valve disc from a closed to an open position. Indeed, the torque thus required may be so great as to entail the use of specially designed motors and other equipment to accomplish operation of the valve.

Similar difficulties occur when seals are used to permit or prevent fluid flow between adjacent surfaces in equipment such as pumps, compressors, shafts, hatch covers and the like.

SUMMARY OF THE INVENTION

With this background of the invention in mind, it is an object of the present invention to provide an improved sealing mechanism wherein the wear ring is resistant to blowout and undesirable displacement from its retaining groove.

It is a further object of this invention to provide a sealing mechanism which permits easy opening and closing of the sealed member without diminishing the efficiency of the sealing mechanism when said member is in a closed position.

It is a still further object of the invention to provide a sealing mechanism which is operative throughout a wide range of pressures, temperatures, corrosiveness and abrasiveness.

It is a still further object of the invention to provide a sealing mechanism comprising an improved wear ring which is operatively retained in a groove.

It is a still further object of the invention to provide an improved sealing mechanism which may be easily and economically manufactured.

It is a still further object of the invention to provide an improved sealing mechanism which accomplishes bidirectional sealing.

These objects and others are accomplished by this invention and a particular embodiment of this invention is described hereinbelow. In this embodiment, a first member, which is to be sealed with respect to a second member, has a groove therein which is so shaped to restrict a portion of a wear-resilient wear ring from leaving said groove. The restricted portion of said wear ring is free to move in said groove so that the seating portion of said wear ring may move toward or away from said second member. A backing ring is generally placed within the groove beneath and in contact with the wear ring and is adapted to urge said wear ring toward the retaining portion of said groove and toward the second member. In an embodiment of this invention, means adjacent the sidewalls of said groove communicate the fluid pressure of the system into the groove and against the restricted portion of said wear ring urging said wear ring against the retaining portion of the groove and toward the second member. Said wear ring is so shaped that said system pressure, when communicated into the groove beneath the flange portion of the wear ring urges the seating surface of the wear ring toward the second member to thus create a bearing pressure greater than system pressure, thus ensuring a positive sealing action between the seating surface and said second member.

BRIEF DESCRIPTION OF THE DRAWINGS

The foregoing features of this invention, as well as the invention itself, may be more fully understood from the following detailed description read together with the accompanying drawings, in which:

FIG. 1 is a plan view of one embodiment of the present invention;

FIG. 2 is a cross-sectional view taken about the line 2—2 of FIG. 1;

FIGS. 3 and 4 are views similar to that of FIG. 2 but showing the seal in operative positions with respect to a member to be sealed;

FIG. 5 is a cross section of a wear ring employed in a modified form of the invention;

FIG. 6 is a cross-sectional view of said modified form of the invention in operative engagement with a member to be sealed;

FIG. 7 is a cross-sectional view taken about the line 7—7 of FIG. 6;

FIG. 8 is a cross-sectional view of a modified form of the invention wherein a stiffening ring is embedded within the seal;

FIG. 9 is a cross-sectional view of a modified form of the invention wherein a stiffening ring and coil spring are employed to support the seal;

FIG. 10 is a cross-sectional view of a modified form of the invention wherein bottom and side stiffening rings, as well as a coil spring, are employed to support the seal;

FIG. 11 is a plan view of a bottom stiffening ring such as that employed in the form of the invention depicted in FIG. 10;

FIG. 12 is a plan view of a side-stiffening ring such as that employed in the form of the invention depicted in FIG. 10;

FIG. 13 is a side elevational view taken about the line 13—13 of FIG. 12;

FIG. 18 is a cross-sectional view of one embodiment of the present invention wherein a padding material is disposed between the wear ring and a garter spring backing ring;

FIG. 19 is a cross-sectional view taken about the line 19—19 of FIG. 18;

FIG. 22 is a cross-sectional view of one embodiment of the present invention wherein the wear ring of this invention is made unsymmetrical to effectuate an equal efficiency bidirectional sealing;

FIG. 23 is a cross-sectional view of a metal wear ring used in one embodiment of the present invention to effectuate an equal efficiency bidirectional sealing;

FIG. 24 is a cross-sectional view of one embodiment of the present invention wherein the wear ring of this invention is made unsymmetrical to effectuate an equal efficiency bidirectional sealing;

FIG. 25 is a cross-sectional view of a wear ring used in one embodiment of the present invention which comprises a core of soft resilient material and two hardened metal rings;

FIG. 26 is a cross-sectional view of an embodiment of the present invention utilizing two sealing mechanisms in tandem to provide a double block and bleed;

FIG. 27 is a plan view of a segmented gate valve provided with a sealing mechanism according to one embodiment of the present invention;

FIG. 28 is a cross-sectional view of FIG. 27 taken along the line 28—28 of FIG. 27 in the direction of the arrows;

FIG. 29 is a cross-sectional view of FIG. 28 taken along the line 29—29 of FIG. 28 in the direction of the arrows;

FIG. 30 is a perspective view of the segmented plug;

FIG. 31 is a cross-sectional view of a butterfly valve provided with a sealing mechanism according to one embodiment of the present invention;

FIG. 32 is a cross-sectional view of FIG. 31 taken along the line 32—32 of FIG. 31 in the direction of the arrows;

FIG. 33 is a perspective view of the segmented plug shown in FIGS. 31 and 32;

FIG. 34 is a cross-sectional view of a modified butterfly valve provided with a sealing mechanism according to one embodiment of the present invention;

FIG. 35 is a perspective view of the rotatable sealing disc element of the modified butterfly valve shown in FIG. 34;

FIG. 36 is a cross-sectional view of a gate valve provided with a sealing mechanism according to one embodiment of the present invention;

FIG. 37 is a perspective view of the tapered valve plug of the gate valve shown in FIG. 36;

FIG. 38 is a cross-sectional view of a globe valve provided with a sealing mechanism according to one embodiment of the present invention;

FIG. 39 is a perspective view of the valve plug of the globe valve shown in FIG. 38;

FIG. 40 is an elevational view of a butterfly valve provided with a sealing mechanism according to one embodiment of the present invention;

FIG. 41 is a cross-sectional view of FIG. 40 taken along the line 41—41 of FIG. 40 in the direction of the arrows;

FIG. 42 is an enlarged fragmentary cross-sectional view of a butterfly valve provided with a sealing mechanism according to another embodiment of the present invention.

DESCRIPTION OF THE PREFERRED EMBODIMENTS

Figure 15:
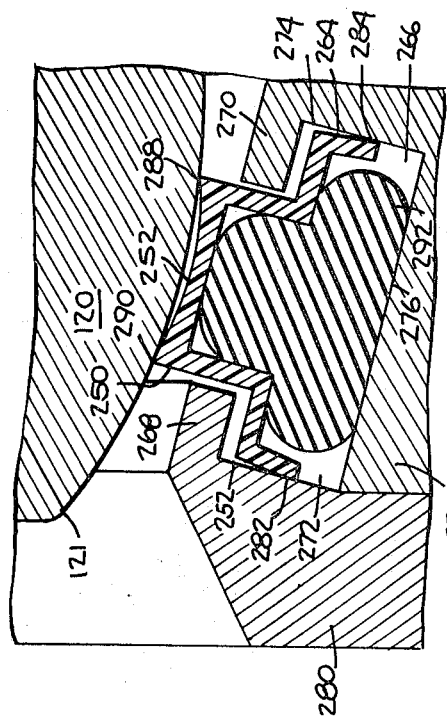
FIG. 15 is a view similar to that of FIG. 14 but showing the seal in an operative position with respect to a member to be sealed.

The present invention can be employed in many kinds of systems which contain fluids at differing pressures, such as hydraulic or pneumatic systems where it is desirable to provide a seal in one or more portions thereof. In such a system, it may be desirable to provide components which can be opened or closed, i.e., positioned so that fluid flow is permitted or obstructed.

The present invention is intended to prevent leakage of fluid when such components are in a closed position, while, without diminishing the efficiency of the seal thus created, permitting such components to be opened with a minimum of force.

These and other advantages of the present invention may be better understood from the following description. As may be seen from an examination of FIGS. 1 through 4 of the accompanying drawings, one embodiment of the invention comprises a frame 101. The term "frame," as used here, is intended to refer to any member of a component of a pressurized system, such as the housing of a valve; compressor of a pump; the marginal perimeter of an aperture to be covered by a hatch or door; or any other member, which is intended to be sealed in conjunction with an adjacent member.

The frame 101 is provided with a groove 102 having a base 103 and sidewalls 104, 105. The groove 102 may have a curved or rectilinear axis. For example, where it is intended to seal a door rotatably mounted in a rectilinear frame, the groove 102 may be disposed in the marginal perimeter. Again, the groove 102 may extend annularly where, for example, the sealing of a spherical member or circular disc is intended, as in a valve such as described hereinbelow.

The mouth of said groove 102 is defined by a pair of flanges 106, 108 depending from the sidewalls 104, 105 and adapted to accommodate a wear ring 109, a seating surface portion of which projects from the mouth of said groove 102. The wear ring 109 is preferably composed of a resilient, wear-resistant plastic material, such as the material known as "Teflon," which is a trademark for a polymer of tetrafluorethylene, or other plastic material of similar characteristics such as urethane. It is to be understood, however, that the wear ring 109 may also be composed of other materials or substances depending on the application of this invention as described hereinbelow.

The wear ring 109 is provided with a pair of shoulders 110, 111 which are abuttable against the flanges 106, 108. As seen in FIGS. 2, 3 and 4, the portion of the wear ring 109 retained in groove 102 by flanges 106, 108 comprises a shoulder portion having a pair of bifurcations 112, 113 which are slidably engageable with the sidewalls 104, 105 of the groove 102. As hereinafter explained, said bifurcations 112, 113 are also yieldably biased against the sidewalls 104, 105.

The bifurcations 112, 113 are provided with a generally V-shaped channel comprising inclined surfaces 114, 115 and a horizontal apex 116. Said bifurcations 112, 113 embrace an elastic means such as an O-ring 118 comprised of an elastomeric material such as natural rubber or synthetic rubber.

As may be seen in FIGS. 2, 3 and 4, the O-ring 118 is disposed beneath the wear ring 109 between the aforesaid generally V-shaped channel and the base 103 of the groove 102. The O-ring 118 is compressed between said base 103 and V-shaped channel so as to urge the wear ring 109 outwardly of the mouth of the groove 102 and the shoulders 110, 111 of said wear ring 109 into abutment with the flanges 106, 108 of groove 102. The O-ring 118 is thus locked into the groove 102 by the wear ring 109 and said O-ring 118 acts as a preloading member for said wear ring 109.

The wear ring 109 is provided with seating surface 119 intended to engage a disc 120 to be sealed against leakage. Said disc 120 includes a sealing surface 121 engageable with said seating surface 119. The disc 120 is representative of a great variety of components which are intended to be sealed in a pressurized system. For the embodiment illustrated in the drawing disc 120 is a valve disc which is to be sealed against hydraulic or pneumatic leakage and is slidably engageable or otherwise abuttable against the seating surface 119 of wear ring 109. Said disc 120 could also be a cover or hatch intended to be sealed against such leakage, it being understood that the specific reference herein to the nature of the disc 120 is only illustrative and is not intended as a limitation of the nature or application of this invention.

The wear ring 109, in cooperation with the groove 102, is adapted to communicate fluid pressure from the regions on either side of disc 120 to the interior of the groove 102. In this connection, it will be observed that the pressure of the fluid in a pressurized system, such as that in which disc 120 is a component, will tend to urge apart the seating surface 119 of the wear ring 109 and the surface 121 of disc 120, thereby decreasing the efficiency of the seal and, in extreme cases, permitting substantial leakage. This tendency, in turn, frequently requires elaborate and costly means whereby it is sought to maintain the efficiency of the seal and reduce its leakage.

In the present invention the system pressure is employed to aid in urging the wear ring 109 and hence seating surface 119 against disc 120 to maintain seal efficiency and avoid leakage therebetween. Thus, as may be seen in FIGS. 1 through 4 of the drawings when the O-ring is used as a backing ring the wear ring 109 is provided with a plurality of ports illustrated by ports 122, 123 adjacent the sidewalls 104, 105 and flanges 106, 198 of the groove 102, said ports 122, 123 being formed on opposing sides of the wear ring 109 and being axially displaced with respect to each other. These ports communicate between the regions 124 or 125, external to the groove 102 and on alternate sides of disc 120, and the region 126 within the groove 102, thereby permitting introduction of the system pressure into said groove 102, as well as venting of fluid pressure from the groove 102 into said system.

Thus, when disc 120 is not in engagement with the wear ring 109, as shown in FIG. 2 of the drawings, (i.e., when the valve is in an open position) the fluid pressure within the groove 102 will be equal on either side of the O-ring 118 and the latter will urge said wear ring 109 outwardly of the groove 102 so as to bring the shoulders 110, 111 of the wear ring 109 into abutment with the flanges 106, 108.

However, when disc 120 is in engagement with the wear ring 109, as shown in FIGS. 3 and 4 of the drawings, (i.e., when the valve is in a closed position) the shoulders 110, 111 will be displaced from engagement with the flanges 106, 108 so as to compress the O-ring as illustrated in FIG. 3.

FIG. 4 illustrates the operation of the sealing mechanism when there is a pressure differential between region 124 and region 125. When such a pressure differential occurs, upstream system pressure will be introduced into the interior of groove 102. If region 124 is at the higher pressure, (i.e., if the fluid flow through the system is from region 124 to region 125 when the disc 120 is in the open position) the system pressure in region 124 will be transmitted through port 122 to region 126, where it will act upon the exposed inclined surface 114 of wear ring 109 so as to urge the wear ring 109 into engagement with surface 121 of disc 120 while at the same time urging the O-ring 118 lateral to the axis of the groove 102, as shown in FIG. 4.

The ports 122, 123 are formed as slots in wear ring 109 and the base 129 of each of said slots is curved, as may be seen in FIG. 1 of the drawings. This conformation of the ports 122, 123 minimizes the possibility of stress concentration which might otherwise occur when the wear ring 109 is subjected to stress, such as tensile or compressive stress during its aforesaid operative use.

When wear ring 109 is composed of a soft, resilient plastic, the said ports may be dispensed with, since the fluid pressure in regions 124 or 125 will urge the wear ring 109 away from the sidewalls and thus provide a passage to permit the communication of said system pressure to within the groove 102, thus allowing the system pressure to react on the surface of wear ring 109 internal to groove 102 as hereinabove described.

When the system pressure from region 124, which is within groove 102, acts upon the surfaces 114, 116 and 115 of the wear ring 109, said pressure creates a thrust beneath said wear ring 109 which is transmitted through the wear ring 109 to urge the disc-seating surface 119 of wear ring 109 into contact with the surface 121 of disc 120 thus causing a seal therebetween. The pressure thus exerted by the wear ring against the disc may be referred to as the bearing thrust or bearing pressure. The bearing pressure is generally uniform over the length of the seal thus created. The wear ring 109 is so shaped that the area of the portion thereof upon which the system pressure within groove 102 acts is greater than the area of the disc-seating surface 119. This design of the wear ring 109 causes the bearing pressure which seats wear ring 109 against the surface 121 of disc 120 to be an amplification of the system pressure which has been introduced from region 124 into the groove 102.

In other words, when a pressure differential occurs between regions 124 and 125 and system pressure is introduced into the groove 102 (either through the ports provided or by a distension of the wear ring 109 as described above) hydrostatic pressure acting on the upstream face of the O-ring has transmitted hydrostatic pressure through O-ring 118 cross section to the wear ring 109 as if the O-ring 118 were a rubber bag filled with water. Since the piston pressure area of the wear ring 109 is greater than the area of the seating surface 119, the resulting bearing pressure seating the wear ring 109 against the disc 120 is greater than the system pressure which is trying to pry the surface 121 of disc 120 away from the seating surface 119.

Furthermore, it will be observed that there is a pressure differential between the fluid pressure in region 124 and the fluid pressure in region 125 which would normally tend to separate surfaces 119 and 121.

This pressure differential causes a system pressure gradient across the area between the wear ring seating surface 119 and the disc-seating surface 121. Assuming that the pressure in region 124 is P and the pressure in region 125 is approximately O, the pressure gradient caused by this pressure differential will be approximately linear with a pressure P at the edge adjacent region 124 and a pressure approximately O at the edge adjacent region 125. This pressure gradient tends to push apart the wear ring seating surface 119 from the disc-seating surface 121. On the other hand, as hereinabove described, the amplified bearing pressure urges the wear ring seating surface 119 toward the disc seating surface 121. As these two surfaces approach one another the system pressure gradient tending to separate these surfaces takes the form of a pressure P at the edge adjacent region 124 and approaches a pressure virtually O along the length of the area between these two surfaces. The net result permits easier disengagement, as well as engagement, of wear ring 109 and disc 120 and reduces the resultant wear therebetween. At the same time, port 123 permits venting of region 138 to transmit fluid pressure therefrom to region 125 and thereby permits lateral displacement of O-ring 118. Thus displaced, the O-ring 118 tends to obstruct the fluid flow between regions 126 and 128.

A cross-sectional view of a wear ring 130 employed in a modified form of the invention is depicted in FIG. 5 of the drawings. As shown in this Figure, the wear ring 130 comprises a seating surface 131 disposed intermediately of lateral surfaces 132, 133 and shoulders 134, 135, all generally in the same conformation as that of the corresponding elements of the previously described wear ring 109. As in the case of wear ring 109, the presently described wear ring 130 further comprises a pair of bifurcations 136, 138 provided with a generally V-shaped groove comprising a pair of inclined surfaces 139, 140 and an apex 141. However, unlike the apex 116 of wear ring 109, apex 141 is of an arcuate conformation whereby, as shown in FIG. 6 of the drawing, said apex 141 is disposed in spaced relation with respect to an adjacent portion of the backing ring 156 employed in this form of the invention. The function of apex 141 will be hereinafter described.

The wear ring 130 depicted in FIG. 5 is shown in its free or unconfined condition, i.e., in a position where it is not confined within any groove nor by any sidewalls thereof. In such unconfined condition, the opposing lateral surfaces 142, 143 of the bifurcations 136, 138 are inclined, thereby assuring their bias against the sidewalls of a groove in which they are confined. The aforesaid arcuate conformation of apex 141 increases the yieldability of the bifurcations 136, 138. It may be noted at this time that the previously mentioned bias of bifurcations 112, 113 of wear ring 109 can also be achieved in a similar manner.

However, while the bias of the bifurcations has been described as above, it should be observed that when the above-described wear rings are composed of soft, resilient plastic materials, they need not be thus biased, and may assume the form depicted in FIGS. 1 through 4 and 6, even when unconfined, said bias being illustrative of one form of the invention.

It is also noteworthy that unlike the form of the invention depicted in FIGS. 1 through 4, the form of the invention wherein wear ring 130 is employed, does not require the use of an elastomeric O-ring. Consequently, this form of the invention may be used in applications involving very high and very low temperatures which would be incompatible with materials such as that of which the O-ring 118 can be composed.

Wear ring 130 may be assembled with the various elements depicted in FIGS. 6 and 7 of the drawings. As shown in these Figures, the wear ring 130 is confined within a groove 144 and projecting therefrom into abutment with a surface 121 of a disc 120 intended to be sealed. The groove 144 is defined by flanges 145, 146, sidewalls 147, 148, outwardly inclined surfaces 149, 150, laterally offset sidewalls 151, 152 and base 153, which form portions of frame 154 and a separable cover member 155.

Bifurcations 136, 138 surmount a backing ring, which in this embodiment is a coil spring 156 disposed within the groove 144. It is understood, however, that other springs of metallic or other heat- or cold-resistant materials of sufficient elasticity may be employed.

The axis of said coil spring 156 may be curvilinear, as, for example, where said spring is formed as a garter spring to support the wear ring 130 in sealing engagement with the circumferential periphery of a disc or other curved surface. The axis of the coil spring 156 may also be rectilinear, as, for example, where the wear ring 130 is employed to seal a planar member or a member having planar elements, in which event, the coil spring 156 may also be seated on the base 153 if so desired.

In the form of the invention depicted in FIGS. 6 and 7, the wear ring 130 is preferably composed of a low temperature resistant plastic material, such as Teflon, or high temperature resistant plastic materials compatible with the temperatures encountered by the sealing mechanism. Said high temperature resistant plastic materials may be Rulon, Meldin, or Vespel, which are trade marks for various synthetic plastic materials, although it is to be understood that the wear ring 130 may also be composed of other materials.

In this form of the invention, it may also be noted that system pressure is employed in a manner generally similar to that previously described, to provide an amplified bearing pressure between surfaces 121 and 131 maintaining seal efficiency when they are in an engaged position. When the fluid pressure in region 158 is greater than that within groove 144, said pressure will tend to urge the shoulder 134 and bifurcation 136 of wear ring 130 away from the flange 145 and sidewall 147 of the groove 144. The lateral surfaces 132, 133, of the wear ring 130 are in spaced relation with respect to the adjacent surfaces of the flanges 145, 146, thereby a channel is formed communicating between said region 158 and said groove 144 to permit the transmission of said system pressure into said grove 144. The depth of the central portion of wear ring 130, i.e., the distance between surface 131 and the top of apex 141, is such as to facilitate bending of said bifurcation 136 and the adjacent portion of wear ring 130 to allow introduction of said pressure within the groove 144 in the above-described manner.

Once thus introduced into the groove 144, said pressure will urge bifurcation 138 of wear ring 130 against the sidewall 148 and flange 146, thereby sealing said pressure against escape to region 159. It is to be noted that in the form of the invention shown in FIGS. 1 through 4 wherein an O-ring 118 is employed, this sealing of the downstream edge of the wear ring is accomplished when the elastic O-ring is distended as shown in FIG. 4. This method of sealing said downstream edge cannot be employed in the form of the invention which utilizes a garter spring 156 in place of the O-ring 118. As in the form of the invention depicted in FIGS. 1 through 4, disc 120 is a closure member which is impermeable to said fluid pressures and which obstructs flow from region 158 to region 159. Again because of the shape of wear ring 130 the same pressure amplification effect described above in connection with wear ring 109 is achieved here.

It will be observed that spring 156 preloads the surface 131 of wear ring 130 against disc 120 and also spreads the bifurcations 136, 138 to seal them against the sidewalls 147, 148 except when one such bifurcation is disengaged therefrom, as aforesaid, by reason of the pressure in region 158 or region 159, it being understood that said pressure may be transmitted to the groove 144 from either of said regions 158, 159 depending on which region has the system pressure.

The retaining bias of wear ring 130, which arises by virtue of its aforesaid preloading and apex 141, may have to be reenforced to prevent blowout of said wear ring 130 under certain design conditions, for example where very high pressures are encountered. Such reenforcement is accomplished in a modified form of the invention shown in FIG. 8 of the drawings wherein a wear ring 160 is disposed within a groove 161 formed in a frame 162 and provided with sidewalls 163, 164 and flanges 165, 166 depending from said sidewalls 163, 164. The wear ring 160 projects from the groove 161 through a mouth defined by said flanges 165, 166 and is abuttable against disc 120 as to form a seal therebetween.

Wear ring 160 is also provided with a pair of shoulders 168, 169 abuttable against said flanges 165, 166 and urgeable out of engagement therewith by the fluid pressure on either side of said disc 120, thereby a channel is formed between said wear ring and said groove 161. This is illustrated in FIG. 8 where said channel is defined by lateral surfaces 170, 171 of the wear ring 160, shoulder 169 thereof and the adjacent surfaces of flange 166 and sidewall 164 of the groove 161.

The wear ring 160 is supported in contact with disc 120 by a backing ring such as O-ring 172 which functions in the manner described in respect to the O-ring 118 of the form of the invention depicted in FIGS. 1 through 4 of the drawing. Said O-ring 172 is seated between the base 173 of the groove 161 and an arcuate surface formed on the bottom of wear ring 160, as shown in FIG. 8. Said wear ring 160 has laterally opposed portions at each end of said arcuate surface 174, which laterally opposed portions are herein referred to as bifurcations 175, 176.

In order to prevent blowout of the wear ring 160, a springable, curved stiffening plate 178 is molded within the wear ring 160, thereby embedding said stiffening plate 178 within said wear ring 160 in a position where it is disposed convexly with respect to the base 173 of the groove 161 and parallel to the arcuate surface 174 of wear ring 160.

The stiffening plate 178 resists blowout pressures which may be created in the groove 161 but by reason of its springable character, does not prevent communication of fluid pressures into said groove 161 in the manner previously described with respect to the wear rings 109 and 130. Moreover, said stiffening plate 178 may be preloaded, if desired, as to urge bifurcations 175, 176 and shoulders 168, 169 into engagement with the adjacent surfaces of the groove 161 and flanges 165, 166, when this form of the invention is assembled as illustrated in FIG. 8. The system pressure is introduced within the groove 161 in a manner substantially as described with respect to wear rings 109 and 130. Pressure amplification is obtained substantially as described above.

In another form of the invention depicted in FIG. 9 of the drawings, a wear ring 179 is employed which is generally similar to that of the wear ring 160 depicted in FIG. 8. However, wear ring 179 is provided with bifurcations 180, 181 which embrace a coil spring 182 and which are provided with inclined surfaces 183, 184, between which is formed a V-shaped depression 185. A springable, curved stiffening plate 186 is accommodated within said V-shaped depression 185 and surmounts said coil spring 182, said stiffening plate 186 is biased against the bifurcations 180, 181 to urge them into abutment with adjacent surfaces 188, 189, 190, 191. Said bifurcations 180, 181 are yieldable, as hereinabove described, to permit the transmission of fluid pressure when they are disengaged from said adjacent surfaces 188, 189, 190, 191.

This arrangement obviates the requirement that the stiffening plate 186 be embedded within extension 179. As in the case of the form of the invention depicted in FIGS. 6 and 7, the form of the invention shown in FIG. 9 is adapted to be used where very high or very low or cryogenic temperatures are encountered. By virtue of the stiffening plate 186 and the shape of the wear ring 179 the form of the invention shown in FIG. 9 is highly resistant to any tendency to blowout or dislodge the wear ring 179 from its assembled position. In this form of the invention, system pressure is introduced into the groove and amplification thereof is achieved substantially as described above.

Another form of the invention is shown in FIG. 10 and is adapted for use where very high temperatures are encountered, which temperatures would be incompatible with plastic materials such as those of which the above-described wear rings 109, 130, 160 and 179 may be composed. In the form of the invention depicted in FIG. 10, the wear ring 192 is preferably composed of a material such as asbestos or other substance of similar characteristics. As is well known, available forms of asbestos may be compressible or deformable so that if it is used for wear ring 192, support thereof is necessary in order to prevent undesirable distortion thereof.

Hence, in the instant case, wear ring 192 is disposed adjacent to sidewalls 193, 194 and flanges 195, 196 in a manner generally similar to that previously described in connection with wear rings 109, 130, 160 and 179. Said wear ring is provided with bifurcations 198, 199 and an arcuate depression 200 which accommodates a stiffening plate 201 suitably affixed to the surface of said depression 200 and surmounting a coil spring 202. Said stiffening plate 201 has a conformation similar to that of stiffening plate 186. The lateral surfaces and shoulders of wear ring 192 are provided with stiffening members 203, 204 which are affixed to said lateral surfaces and shoulders by a suitable adhesive or by other suitable means.

The stiffening members are of a generally Z-shaped cross section and are depicted in FIGS. 12, and 13, as well as FIG. 10, where it will be seen that they include a longitudinal member, generally designated by the numeral 205. The web 206 of said longitudinal member 205 is provided with horizontal fingers 207 which is embedded in wear ring 192 and segmented by a plurality of slots 208 which also extend to the lateral elements 209, 210 depending from said web 206. Elements 210 are interrupted by notches 211.

With this arrangement, the longitudinal members 205 resist compressive and tensile stresses, such as those arising from system pressures, pressures arising from the action of the spring 202 and blowout pressures tending to dislodge the wear ring 192. At the same time, the slots 208 and notches 211 permit radial displacement of wear ring 192 such as may be imposed, for example, when it has an annular or other curvilinear disposition. Said longitudinal members 205 function as springs which permit such disposition but maintain the cross-sectional conformation of wear ring 192 as depicted in FIG. 10.

The stiffening plate 201 in this form of the invention, as well as in the form of the invention depicted in FIG. 9 and 10, may be notched or serrated so as to assume the wavelike conformation depicted in FIG. 11 of the drawings. As there shown, said stiffening plate 201 is characterized by a plurality of V-shaped members including inclined portions 212, 213 connected by intermediate portions 214, 215. The stiffening plate 201 provides rigidity to the wear rings 160, 179, 192 to prevent blowout of said wear ring by the action of the system pressure but also permits displacement of the said wear rings into their respective grooves. This reinforced embodiment of the invention is of advantage when the fluid within the system includes abrasive or gritty particles which may tend to be caught between the mating surfaces of wear ring and the disc to be sealed. When thus entrapped, these particles may exert a localized and concentrated pressure which will tend to urge said wear ring outwardly of their engaged position. The stiffening plate 201 is compliant with such outward movement, i.e., it accommodates stretching of the wear ring induced by such particles.

Similarly, where closure of the disc by the wear ring causes a substantial displacement of the wear ring and results in a substantial stretching thereof, which could entail the permanent deformation of said wear ring, the stiffening plate 201 permits displacement of the wear ring but prevents the permanent deformation thereof.

It is to be noted that the above-described form of the stiffening plate 201 facilitates its bonding to or within the wear ring so that its surface is firmly adherent thereto.

For use in systems where higher pressures and extreme temperatures are found, another form of this invention replaces plastics with elastically deformable metals, but the unique seal construction of this invention still assures a completely resilient seal with bubbletight closure up and down stream of the system pressure flow. FIGS. 14, 15, 16 and 17 illustrate two alternate metal seal designs incorporating the principles of this invention.

As shown in FIGS. 14, 15, 16 and 17, a metal wear ring 250 is comprised of stainless steel which has been fully work hardened. The wear ring 250 comprises a disc-seating surface 252 disposed intermediately of lateral surfaces 254 and 256 and shoulders 258 and 260, generally in the same conformation as that of the corresponding elements of the previously described nonmetal wear rings. The wear ring 250 further comprises a pair of inclined surfaces 262 and 264.

Figure 14:
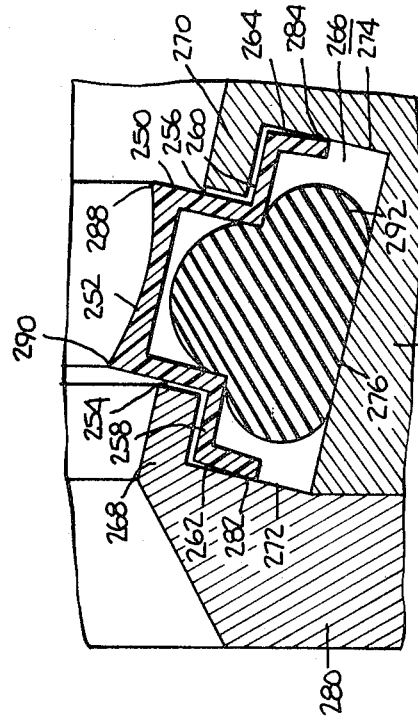
FIG. 14 is a cross-sectional view of one embodiment of the present invention wherein a metal wear ring and an elastomeric O-ring is employed.

Wear ring 250 may be assembled with the various elements depicted in FIGS. 14 and 15 of the drawings. As shown in these Figures, the wear ring 250 is housed within a groove 266 with the seating surface 252 projection therefrom. When the valve is closed, this seating surface abuts with a surface 121 of a disc 120 to create a seal. The groove 266 is defined by flanges 268 and 270, laterally offset sidewalls 272 and 274 and base 276, which form portions of frame 278 and a separable cover member 280.

The wear ring 250 overall width (measured between points 282 and 284 of inclined surfaces 262 and 264 of wear ring 250 when said wear ring is in a free or unconfined condition) is slightly wider than the width of the groove 266 (as measured between laterally offset sidewalls 272 and 274). Furthermore, when the wear ring 250 is in a free or unconfined condition, i.e., in a position where it is not confined within any groove or by any sidewalls thereof, the pair of inclined surfaces 262 and 264 are slanted outwardly, thereby assuring their bias against the opposing sidewalls 272 and 274 of groove 266 in which they are confined. Thus, when the sealing mechanism depicted in FIGS. 14 and 15 is assembled, the pair of inclined surfaces 262 and 264 of wear ring 250 are preloaded against the opposing lateral sides 272 and 274 of the groove 266.

The inside diameter of the wear ring 250, shown in FIGS. 14, 15, 16 and 17, is slightly smaller than the outside diameter of the disc 120 intended to be sealed. Furthermore, the disc-seating surface 252 of the wear ring 250 is curved slightly more than the curvature of the surface 121 of disc 120 intended to be sealed. Thus, it may be seen that when the disc 120 is in the closed position, as shown in FIG. 15, the wear ring 250 is hoop stretched. This hoop stretching of wear ring 250 causes the upstream and downstream edges 288 and 290 of the seating surface 252 of wear ring 250 to bite into and bear tightly against the surface 121 of disc 120 intended to be sealed. Furthermore, when the wear ring 250 is hoop stretched, as described above, the inclined surfaces 262 and 264 of wear ring 250 tend to spread out or widen, thereby increasing the side preload of the wear ring 250 against the laterally offset sidewalls 272 and 274 of the groove 266. With this embodiment of the present invention a highly preloaded, symmetrical seal results. Such a seal requires 200 to 400 p.s.i. upstream pressure to overcome the side preload described above. At higher pressures, the cavity formed between the wear ring 250 and the groove 266 becomes pressurized and the wear ring 250 is pressure seated tight.

The wear ring 250 surmounts a backing ring, which in the embodiment shown in FIGS. 14 and 15 is an elastic means such as an O-ring 292 comprised of an elastomeric material such as rubber or the synthetic material known as NEOPRENE or VITON which are trademarks for a synthetic rubber composition. As described above in connection with other embodiments of this invention, the O-ring 292 acts as a preloading member for the wear ring 250. Furthermore, as described hereinabove with regard to other embodiments of this invention, the VITON O-ring 292 supplements the side-sealing action of the metal wear ring 250. In addition, at higher system pressures, when the pressure is introduced within the groove 266 a distortion of the O-ring 292 results in an increased side-sealing action.

The form of the invention shown in FIGS. 14 and 15 is generally designated "fire-safe." The designation "fire-safe" is usually applied to valves subjected to temperatures between −60° F. and +400° F. which must be operable and tight sealing during and after exposure to fire. Should the VITON O-ring 292 be destroyed by fire, the metal wear ring 250 independently and efficiently continues to provide tight sealing due to its preloaded flared flange tips 282 and 284 as described hereinabove.

Figure 17:
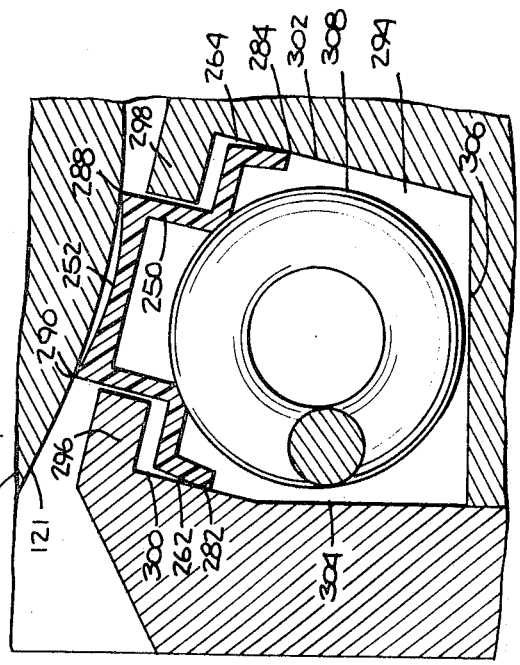
FIG. 17 is a view similar to that of FIG. 16 but showing the seal in an operative sealing position with respect to a member to be sealed.
Figure 16:
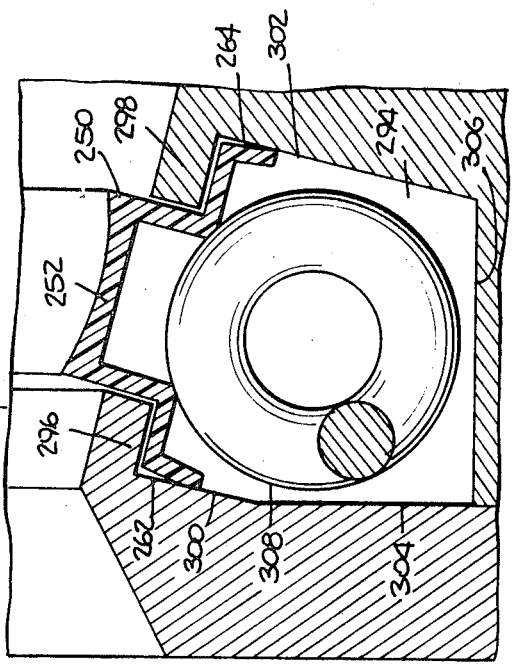
FIG. 16 is a cross-sectional view of one embodiment of the present invention in a nonsealing position wherein a metal wear ring and a garter spring is employed.

Wear ring 250 can also be assembled with the various elements depicted in FIGS. 16 and 17 of the drawings. As shown in these FIGS., the wear ring 250 is confined within a groove 294 and projecting therefrom into abutment with a surface 121 of a disc 120 intended to be sealed. The groove 294 is defined by flanges 296 and 298, laterally offset sidewalls 300 and 302, sidewall 304 and base 306.

As described above in connection with FIGS. 14 and 15, the wear ring 250 overall width in the unconfined position has such a relation to the width of groove 294 and the pair of inclined surfaces 262 and 264 of wear ring 250 are so biased that, when the sealing mechanism depicted in FIGS. 16 and 17 is assembled, the pair of inclined surfaces 262 and 264 are preloaded against the opposing lateral sides 300 and 302 of groove 294.

The wear ring 250 surmounts a backing ring, which in the embodiment shown in FIGS. 16 and 17 is a metal garter spring 308 which can be comprised of INCONEL X or exotic metals such as RENE 41. The metal garter spring 308 provides hoop-radial preloading of the seating surface 252 of the metal wear ring 250. Garter spring 308 further provides a side-wedging preload of inclined surfaces 262 and 264 against the opposing lateral sides 300 and 302 of groove 294 causing flared flange tips 282 and 284 to "bite" into said lateral sidewalls to prevent system pressure from bypassing the seating area by circumventing the wear ring 250.

The form of the invention shown in FIGS. 16 and 17 has particular application at high temperatures. The metal wear ring 250, usually 316 stainless steel, tends to lose most of its elastic memory at high temperatures. The metal garter spring 308, being of more sophisticated material, maintains the desired preload on the wear ring 250 within the groove 294.

FIGS. 18 and 19 illustrate an improved cryogenic application of the present invention. As shown in these Figures, a wear ring 310 is confined within a groove 312 and projecting therefrom. The groove 312 is defined by flanges 314 and 316, laterally offset sidewalls 318 and 320, sidewall 322 and base 324, which form portions of frame 326 and a separable cover member 328.

The wear ring 310 is comprised of a resilient, wear-resistant plastic material similar to wear ring 130 described above. The wear ring 310 comprises a disc-seating surface 330 disposed intermediately of lateral surfaces 332 and 334; shoulders 336 and 338 and bifurcations 340 and 342 which are provided with a truncated V-shaped channel comprising inclined surfaces 344 and 346 and a horizontal apex 348.

Bifurcations 340 and 342 surmount a backing ring, which in this embodiment is a garter spring 350 disposed within the groove 312. For the cryogenic application the garter spring 350 may be comprised of metal or any other cold-resistant material with sufficient elasticity.

Interposed between the bifurcations 340 and 342 of wear ring 310 and the garter spring 350, a dummy cushion 352 is positioned. The dummy cushion 352 is provided in this embodiment of the invention because the extreme hardness of the plastic material comprising the wear ring 310 at cryogenic temperatures requires the garter spring 350 to be very strong, thus at ambient temperatures, the garter spring 350 in the absence of the dummy cushion 352 would gouge the wear ring 310 and possibly cause leakage around the seal.

The dummy cushion 352 is illustrated in FIG. 19 which is an unconfined side view of the assemblage comprising the wear ring 310, the dummy cushion 352 and the garter spring 350. In this illustration the dummy cushion 352 is not continuous but comprises a plurality of arcuate pads of cushion material. When the dummy cushion 352 is discontinuous, as illustrated in FIG. 19, the garter spring 350 does not have to circumferentially compress the dummy cushion 352 in order to preload the wear ring 310. It is to be noted that the dummy cushion just described can be utilized with any form of the invention wherein the backing ring comprises a garter spring and there is concern with gouging the wear ring.

Figure 20:
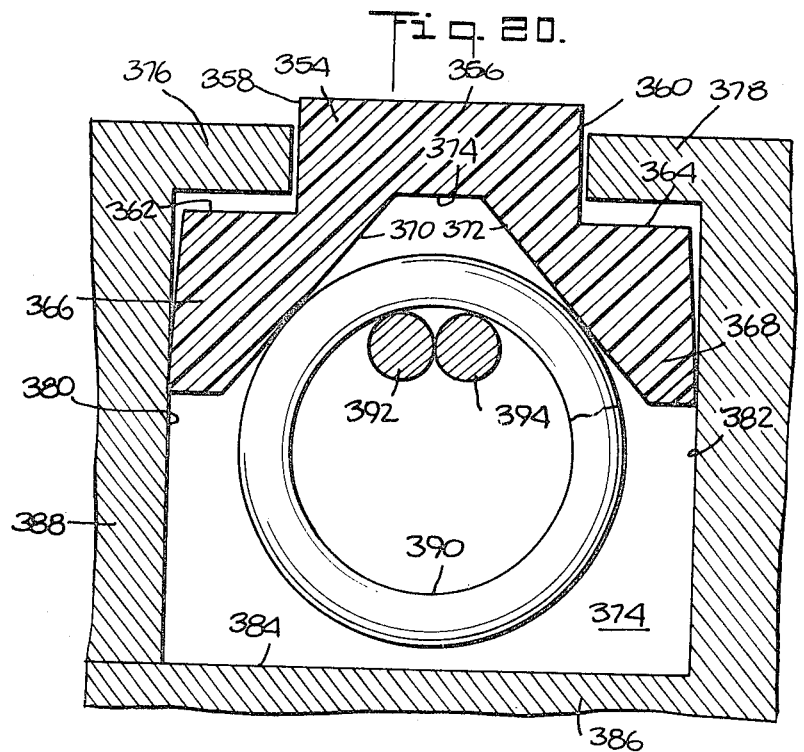
FIG. 20 is a cross-sectional view of one embodiment of the present invention utilizing hoop tensile strips in conjunction with a garter spring as a backing ring.

FIG. 20 shows an embodiment of the present invention for use in applications wherein a high preload of the wear ring is necessary. In such applications, i.e., cryogenic, tight sealing metal seals and large diameter valves, the use of single or multiple wound garter springs may become inadequate to provide the necessary preload. In such a case, the embodiment of the present invention shown in FIG. 20 utilizes both a garter spring and hoop tensile bands generally in the form of wire. The hoop spring modulus of the garter spring is negligible compared to the hoop spring modulus of the tensile bands and, thus in this application of the present invention, the principle function of the garter spring is to transfer the tensile hoop force of the bands to the wear ring. Thus, any suitable equivalent buffer material such as that illustrated in FIGS. 18 and 19 could be substituted in the garter spring in this application.

As shown in FIG. 20 a wear ring 354 is comprised of a resilient, wear-resistant plastic material similar to wear ring 130 described above. The wear ring 354 comprises a disc-seating surface 356 disposed intermediately of lateral surfaces 358 and 360 and shoulders 362 and 364. The wear ring 354 further comprises a pair of bifurcations 366 and 368 provided with a truncated V-shaped channel comprising inclined surfaces 370 and 372 and a horizontal apex 374. The bifurcations 366 and 368 of wear ring 354 are biased against the sidewalls of a groove 374 in which they are confined as described hereinabove in connection with wear ring 130 depicted in FIGS. 5, 6 and 7. The wear ring 354 is confined within a groove 374 and projecting therefrom. The groove 374 is defined by flanges 376 and 378, laterally offset sidewalls 380 and 382 and base 384, which form portions of frame 386 and a separable cover member 388. The wear ring 354 surmounts a backing ring, which in this embodiment of the invention is a metal garter spring 390.

A plurality of tensile bands, represented by tensile bands 392 and 394, are threaded through the garter spring 390. The tightly wound garter spring 390 is of such a diameter that the wear ring 354 is urged to its furthest upward extension. Thus, when the closure member to be sealed (not shown) is in the closed position, the plurality of tensile bands, represented by tensile bands 392 and 394 within the garter spring 390 provide an increased preloading of wear ring 354.

Figure 21:
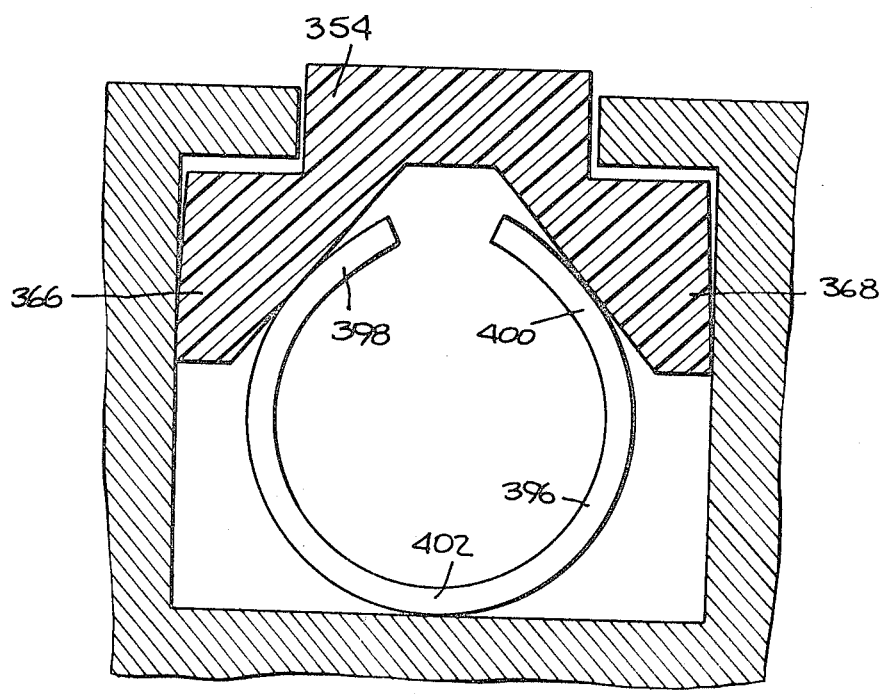
FIG. 21 is a cross-sectional view of one embodiment of the present invention utilizing a resilient finger member to provide proper preloading for the wear ring of this invention.

An alternative embodiment of the present invention for providing a proper preloading in large diameter valves is illustrated in FIG. 21. In FIG. 21 the garter spring 390 and the tensile bands 392 and 394 are replaced by a finger spring 396. The finger spring 396 comprises a pair of fingers 398 and 400 connected to a base 402. The fingers 398 and 400 are resiliently biased against the bifurcations 366 and 368 of wear ring 354. The finger spring 396 also provides the proper preloading of wear ring 354.

In the above disclosure the sealing mechanism of this invention possesses bidirectional sealing features. By that it is meant, the sealing provided by this invention will be operative if the flow of system pressure in the system reverses direction. However, there are certain orientations of the seal with respect to the flow of system pressure such that the seal of this invention is not truly symmetrical with respect to the totality of forces within the system. For example, when applied to valves, the seal of this application, oriented at certain angles with respect to the flow of system pressure through the valve, exhibits more reliable sealing when the flow of system pressure is such as to urge the disc into the closed position than when the direction of system pressure is such as to urge the disc into the open position. To counteract this complex system of unsymmetrical forces, a sealing mechanism of this invention is utilized which comprises a sealing surface adapted to be unsymmetrical relative to the cross-sectional view of said wear ring. With this embodiment of the present invention, when system pressure is tending to push the disc away from the seal into the open position, a much higher unit-bearing pressure results and a more reliable sealing occurs with this direction of sealing pressure. When pressure is in a direction urging the sealing disc toward the seal into the closed position, some of the amplification effect of the present invention is cancelled due to the unsymmetric shape of the sealing surface of the wear ring, thus decreasing some of the seal's reliability with this direction of system pressure. Thus, this modification of the present invention will result in equal seal reliability in both system pressure flow directions.

FIG. 22 illustrates one method of effecting this embodiment of the present invention. A wear ring 404 is provided with an unsymmetric seating surface 406 which has a notch 408 along one edge of said seating surface 406 and extending in the direction of the axis of said wear ring 404. In all other respects, wear ring 404 is substantially identical to wear ring 109 discussed hereinabove. FIG. 23 shows this embodiment of the present invention with regard to a metal wear ring 410 having a sealing surface 412 containing a similar notch 414 on the edge of said sealing surface 412 extending along the axis of said wear ring 410. Wear ring 410 is substantially identical in all other respects to wear ring 250 discussed hereinabove. Finally, FIG. 24 shows another embodiment of the present invention wherein an unsymmetric wear ring has one of its bifurcations extended relative to the other. In FIG. 24, a wear ring 416 is provided with a bifurcation 418 which is longer than bifurcation 420. In all other respects, wear ring 416 is substantially identical to wear ring 109 discussed hereinabove. The lengthening of one of the bifurcations relative to the other of the wear ring of this invention will accomplish the same end results as the unsymmetrical sealing surface discussed hereinabove.

Heretofore, it has been pointed out that the sealing mechanism of the present invention may employ a wear ring comprised of many different types of materials. It is also to be noted that the wear ring used in the present invention may comprise a combination of these materials as well. FIG. 25 shows a wear ring according to the teachings of this invention which comprises a wear ring 422 substantially identical to wear ring 109 except that two hardened metal rings 424 and 426 are molded into the plastic wear ring 422. The metal rings 424 and 426 each comprise a hardened surface 428 and 430 which, together with the seating surface 432, form the seating surface of said wear ring 422. This embodiment of the present invention provides a high resistance to abrasion but yet possesses a soft and resilient core. Pressure beneath the wear ring 422 will seat both the metal edges 424 and 426 as well as the soft plastic core. A further advantage of this embodiment is that it provides a certain amount of "fire-safe" protection.

It is to be understood that it is within the scope of this invention that a plurality of sealing mechanisms encompassed by this invention can be used together. For example, in certain industrial applications it becomes highly necessary to ensure that no leakage of system pressure passes the valve when in the closed position. This is generally accomplished by having two valves and having the capability of venting off the chamber between the valves. Any leakage past the first valve will then drain out through the chamber between the valves. This is referred to as double block and bleed. FIG. 26 illustrates the application of two of the sealing mechanisms of this invention utilized in tandem. A wear ring 434 substantially identical to wear ring 109 is placed in groove 436 above O-ring 438 substantially as described hereinabove. Similarly, a wear ring 440, substantially identical to wear ring 109, is positioned in a groove 442 above O-ring 444. Between these two sealing mechanisms is positioned a chamber 446 to bleed off any system pressure which may get into region 448 between these two sealing mechanisms. A disc 450 is shown in the closed position and is made somewhat thicker than valve discs discussed hereinabove to accommodate the two sealing mechanisms simultaneously. It is to be noticed that any combination of the various embodiments of this invention may be used in the double block and bleed application described with respect to FIG. 26. For example, if wear ring 440 were to be replaced with a metal wear ring above a garter spring, the double block and bleed application of the present invention could then be utilized wherein a "fire-safe" condition was needed in one direction of system flow but not in the other.

The various embodiments of the present invention described hereinabove may be used in a variety of applications. One specific application described hereinbelow is the use of the present invention in valves. With reference to FIGS. 28 and 29 of the drawing, a valve body 452 is provided with a chamber designated generally at 454. Said chamber 454 has an inlet port 456 and an outlet port 458. A valve seat 460 is provided in said valve body 452 at one end of said chamber 454. A trunnion bearing 462 and circular seat 464 defining an opening 466 are provided in said valve body 452. Said opening 466 is contiguous with said chamber 454.

The valve body 452 is provided with end flanges 468 and 470 which can be attached to a conduit.

A bonnet 472 is provided with a stem bearing 474 fastened to a circular seat 464 by means of bolts 476. Bonnet 472 is provided with a circular recess 478 adapted to accommodate a fluid-packing material 480 positioned between circular seat 464 and circular recess 478.

A segmented plug, generally indicated by reference numeral 482, is provided with a sealing flange 484. The segmented plug 482 is shown in FIGS. 28 and 29 as having a dome shape and comprising a segment of less than 90°. Thus in the open position of this valve the segment of the segmented plug 482 will be located in one quadrant of the chamber 454 and will not obstruct the fluid flow from the inlet port 456 via chamber 454 to outlet port 458. The segmented plug 482 is further provided with a trunnion 486 in a stem 488. Trunnion 486 is rotatably mounted in trunnion bearing 490. Stem 488 is rotatably mounted in a stem bearing 474. An O-ring fluid-type packing 492 is provided between stem 488 and stem bearing 474.

Segmented plug 482 is further provided with a concave surface 494, shown in FIG. 28, adapted to cooperate with a concaved wall 495 of valve body 452 thereby defining the volume of flow through the valve from inlet port 456 to outlet port 458.

With reference to FIG. 28 it is to be noted that stem 488 and trunnion 486 are coaxial. The sealing flange 31 is offset in relation to the common axis of stem 488 and trunnion 486. Trunnion 486 is provided with a fluid passageway 496 which is further described hereinbelow.

The sealing flange 484 is provided with the sealing mechanism of this invention designated generally by the numeral 498. In the embodiment shown in FIGS. 28 and 29 the sealing mechanism is substantially identical to that hereinabove described in conjunction with FIGS. 2, 3 and 4. However, it is understood that any other embodiment of the invention hereinabove described can be used. FIG. 28 shows the valve in the open position and FIG. 29 shows the valve in the closed position. The "T" groove hereinabove described in connection with FIGS. 2, 3 and 4 is provided in the sealing flange 484. The O-ring 118 is positioned within said groove. The wear ring 109 is deformed sufficiently to allow the flange area of the wear ring 109 to be positioned within the groove above the O-ring 118. In the alternative (not shown) the "T" groove can be formed by two separable members of sealing flange 484 with the wear ring 109 and O-ring 118 located therein.

A handle 500 is attached to stem 488 by means of compression washer 502 and screw 504. In operation, handle 500 will be mechanically manipulated to position the segmented plug 482 into the valve open position wherein system pressure is free to flow through valve body 452 as shown in FIG. 28. To place the valve in the closed position, handle 500 is rotated to the position shown in FIG. 29 wherein the seating surface 119 of wear ring 109 is brought into contact with the valve seat 25. As the seating surface 119 of wear ring 109 is brought into engagement with valve seat 460 the wear ring 109 is pushed downward into the groove of sealing flange 484. The O-ring 118 tends to urge the seating surface 119 of wear ring 109 into engagement with valve seat 460.

System pressure may flow through fluid passageway 494 into the region 506 located between the end of trunnion 486 and valve body 452. This system pressure will act on the end of trunnion 486 to counteract the system pressure on concave surface 494 in the direction of arrow 508. A fluid passageway 510 is provided in bonnet 472 to relieve the system pressure acting on packing material 492.

Reference is now made to FIGS. 31, 32 and 33 wherein a "butterfly-type" valve is employing the invention shown. A valve body 452A is provided with a chamber 454A having an inlet port 456A and an outlet port 458A.

A segmented plug, generally indicated by reference numeral 482A, is provided with a sealing flange 484A. A shaft 512 is integrally formed with segmented plug 482A. As shown, segmented plug 482A is provided with a cavity 514 and is fastened to shaft 512 through cavity 514 with screws 516. Shaft 512 is provided with a trunnion portion 518 which is rotatably mounted on trunnion bearing 490A and a stem portion 488A rotatably mounted on stem bearing 474A. A fluid-tight packing material is placed around shaft 512.

A tapered collar 520 is slidably mounted upon shaft 512. A bushing 522 provided with a taper 524 adapted to be a companion to tapered collar 520 is fastened to valve body 452A by a weld.

A handle 500A is pivotally connected to shaft 512 by means of pintle 526. Areas 528 and 530 of handle 500A lie on opposite sides of pintle 526 and rest upon tapered collar 520. Washers 532 are positioned over shaft 512 and are interposed between valve body 452A and the bottom of tapered collar 520.

Sealing flange 484A is provided with the sealing mechanism of this invention designated generally as 498A which is substantially identical to that described in connection with FIGS. 2, 3 and 4 hereinabove. Of course, any other embodiment could be so used.

In operation handle 500A will pivot up or down on pintle 526. When handle 500A is lifted up, area 528 engages tapered collar 520, thereby depressing wave washers 532. This action frees shaft 512 from the locking action of tapered collar 520 against companion taper 524. The tapers 520 and 524, under the influence of wave washers 532, secure shaft 512 in selected position and therefore segmented plug 482A is selectively positioned in chamber 454A upon rotation of shaft 512.

If handle 500A is depressed, area 530 engages tapered collar 520 in the same manner and for the same reason and function as described when lifting handle 500A.

FIGS. 34 and 35 illustrate a modified form of "butterfly" valve wherein the sealing mechanism of FIGS. 2, 3 and 4 is employed. FIG. 34 shows the T-groove 534 in sealing flange 484B. The valve seat 460B in valve body 452B lies on opposite sides of shaft 512B. Sealing flange 484B is fastened to shaft 512B in a manner to permit the wear ring 109 of the sealing mechanism to engage valve seat 460B upon rotation of shaft 512B.

FIGS. 36 and 37 illustrate a gate valve consisting of a valve body 452C provided with a chamber 454C having inlet port 456C, outlet port 458C and valve seats 460C and 460CC.

A bonnet 472C provided with a stem bearing 474C is fastened to valve body 452C by means of bolts 476C.

A plug 482C is provided with a sealing flange 484C. The sealing flange 484C is circular in one plane and tapered in another plane and is provided on opposite sides with sealing mechanisms substantially identical to those described hereinabove in connection with FIGS. 2, 3 and 4.

A shaft 512C is rotatably mounted in a stem bearing 474C provided in bonnet 472C and is fastened by means of a pin 536 to sealing flange 484C.

In operation, rotation of shaft 512C lifts sealing flange 484C and therefore the sealing mechanisms of this invention out of engagement with valve seats 460C and 460CC, from the position shown in FIG. 36 to a position where sealing flange 484C is located in region 538 in bonnet 472C.

FIGS. 38 and 39 illustrate a globe valve comprising a valve body 452D provided with a chamber 454D having an inlet port 456D, an outlet port 458D and valve seat 460D.

A bonnet 472D provided with a stem bearing 474D is fastened to valve body 452D.

A plug 482D provided with a disc-sealing flange 484D is provided with a sealing mechanism substantially identical to the sealing mechanism hereinabove described in connection with FIGS. 2, 3 and 4.

A shaft 512D is rotatably mounted in stem bearing 474D provided in bonnet 474D and is fastened by means of T-head and slot 540 to plug 482D.

In operation, rotation of shaft 512D lifts sealing flange 484D and therefore the wear ring of the sealing mechanism out of engagement with valve seat 460D, from the position shown in FIG. 38 to a position where sealing flange 484D is above valve seat 460D.

It is apparent that the sealing mechanism of this invention may be used to provide a fluid-type seal for many types of hydraulic valves. Furthermore, although the above illustrative examples of the different types of valves with which the present invention may be used employed the embodiment of the present invention described hereinabove in connection with FIGS. 2, 3 and 4, it is understood that any of the embodiments described hereinabove could have been used. Furthermore, the application of the present invention to these illustrative examples of valves has been limited to the application of the sealing mechanism located on the movable member of the valve, i.e., that portion of the valve which is movable to the valve "open" or valve "closed" position. The present invention may also be located in the stationary or frame portion of the valve. This application is illustrated in FIGS. 40, 41 and 42.

FIGS. 40 and 41 show a butterfly valve utilizing an embodiment of the present invention which is located in the housing or frame of the butterfly valve and not in the rotatable valve disc. This valve includes a bonnet 616, an annular housing 618, a valve disc 619 mounted upon a shaft 620 engaged with trunnion bearings 621, 622 and rotatable by means of a suitable handle 623. The shaft 620 is also engaged with a cone clutch 624 surmounting spring washers 625, whereby said valve disc 619 may be opened or closed upon depression of the cone clutch 624 and rotation of the handle 623, as desired.

The present invention is disposed between the housing 618 and the valve disc 619 which in FIGS. 40 and 41 are depicted in a closed position. Any of the above-described forms of the invention may be employed to accomplish a seal between the housing 618 and valve disc 619, the groove therefor being provided in said housing and the form of the invention employed being generally designated by the numeral 626.

It will be observed that in this application, the said form of the invention 626 has an annular conformation and functions as a seal which, by reason of its wear-resistant qualities, is very long lived. This seal provides leakproof sealing in either direction, with respect to said valve disc 619 and housing 618 and can be opened and closed with a minimum of torque and without heavy mechanical preloading such as is frequently encountered in conventional equipment. Moreover, by reason of the simplicity of the seal design and the avoidance of any necessity for additional equipment to effect operation of the valve, the resultant valve assembly is substantially lighter and more compact than other conventional valves.

Another application of the invention may be observed in FIG. 42 of the drawings which is also concerned with a valve disc 628 such as is encountered in a butterfly valve forming part of a system containing a pressurized fluid at an elevated temperature. Said disc 628 is suitably mounted upon a shaft or stem 629 rotatably disposed in a bearing 630 which, in turn, is accommodated within a frame such as the valve housing 631.

A retainer 632 is affixed to said valve housing 631 by a threaded screw 633. Said retainer 632 has an inner face generally designated by the numeral 634 which, together with a shoulder 635 and a surface 636 adjacent thereto, provided on said valve housing 631, define a groove accommodating a wear ring 638 provided with bifurcations 639, 640 embracing a helical, garter spring 641, the axis of which is annularly disposed so as to permit said garter spring 641 to conform yieldably to said bifurcations 639, 640.

When the valve is in an open position, i.e., when wear ring 638 is not engaged with the valve disc 628, the seating surface of the wear ring 638 is urged by said garter spring 641 to assume the position shown in broken lines and designated by the numeral 642. Said wear ring 638 projects through a mouth defined by a pair of flanges 643 depending from each side of the aforesaid groove. When, however, the valve disc 628 is rotated into abutment with the wear ring 638, it slidably engages said wear ring 638 resulting in the position of said wear ring 638 as depicted by solid lines in FIG. 16.

The bifurcations 639, 640 have a central depression or apex 646 which permit bifurcation 639 to yield to system pressure in the region 648 so as to form a channel between said bifurcation 639 and the inner face 634 of the groove, thereby permitting introduction of said pressure into the groove and operation of the wear ring 638 in the previously described manner.

When said wear ring 638 is not confined within the groove, the bifurcations 639, 640 assume the positions shown in broken lines and designated by the numerals 639a, 640a. When said bifurcations are confined within the groove, the retainer 632 imposes an end load directed along the central axis of the wear ring 638 so that the bifurcations 639, 640 are preloaded to the positions depicted in solid lines in FIG. 42. Said bifurcations 639, 640 thus react with a bias against the faces 634, 636 when retained within the groove.

The seal thus described is adapted for performance under high-temperature conditions, which are compatible with the materials of which its components are formed. According to conventional practice, a high-temperature packing 648 is also accommodated between the retainer 632 and the housing 631 in a chamber 649, as shown.

In all of the above embodiments of the present invention, a backing ring was utilized in several different forms. It is understood that any form of the backing ring may be utilized which provides the proper preloading for the wear ring pursuant to the teachings of this invention. Furthermore, it is to be noted, that the backing ring may be eliminated in those embodiments of the present invention wherein the wear ring itself provides its own preloading pursuant to the teachings of this invention, because, for example, the wear ring of that particular embodiment possesses elastic characteristics.

The foregoing is considered as illustrative only of the principles of my invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. A sealing mechanism to seal against the fluid pressure of a system comprising:
   a. a first member having an elongated groove extending with respect to a surface of the first member, the elongated opening of the groove adjacent to the surface being defined by two elongated flanges depending from the opposite sides of said groove and extending toward one another, the width of the opening between the flanges being less than the width of the bottom portion of said groove between said sides thereof,
   b. an elongated wear ring disposed in part in said groove and extending along the length thereof, the fit of the wear ring enabling the wear ring to move inwardly and outwardly with respect to said groove, said wear ring having a seating surface portion with a seating surface thereon, said seating surface portion having a width enabling said seating surface portion to extend through the opening, and a shoulder portion movable with respect to said groove and having a width greater than the width of said groove opening, said width enabling said shoulder portion to be abuttable against said groove flanges to retain said wear ring in said groove, the area of the bottom of the shoulder portion facing the bottom portion of the groove being greater than the area of the seating surface, the bottom of said shoulder portion having an elongated channel extending along the length of said wear ring and upwardly into said shoulder portion substantially to said seating surface portion, said channel bifurcating said shoulder portion into two portions, each of which is movable toward or away from the sides of the groove, one portion of said shoulder portion enabling fluid pressure to enter the groove by passing between one side of said groove and said wear ring to urge the other portion of the shoulder portion adjacent the other side of said groove toward the side and flange related thereto,
   c. a second member having an elongated sealing surface which is engageable with said wear ring seating surface along the length thereof to close said sealing mechanism against the fluid pressure, the sealing pressure between the sealing surface and the seating surface being greater than the fluid pressure on the bottom of the shoulder portion of said wear ring in response to the greater area thereof as compared to the area of the seating surface of the wear ring, and
   d. a backing ring disposed in said groove between the channel of the wear ring and the bottom of the groove, said backing ring urging said wear ring outwardly with respect to said groove and urging said portions of said shoulder portion toward the sides of the groove.

2. A sealing mechanism according to claim 1 wherein said groove formed in said first member has a substantially inverted T-shaped cross section intersecting the length of the groove.

3. A sealing mechanism according to claim 1 wherein said wear ring is comprised of a resilient plastic material.

4. A sealing mechanism according to claim 1 wherein said portions of said shoulder portion form a generally V-shaped channel therebetween.

5. A sealing mechanism according to claim 1 wherein said shoulder portion of said wear ring is yieldably and slidably biased against both sides of said groove.

6. A sealing mechanism according to claim 1 wherein said backing ring is comprised of an elastomeric material.

7. A sealing mechanism according to claim 1 further comprising:
a means extending through at least a portion of said wear ring for communicating fluid pressure of the system into said groove beneath the shoulder portion of said wear ring to aid in urging said wear ring seating surface against the second member sealing surface.

8. A sealing mechanism according to claim 7 wherein said means for communicating fluid pressure into said groove comprises said wear ring having at least one port extending from adjacent said seating surface portion to one side of said channel and adjacent to one side of said groove, said one port being adapted to communicate said fluid pressure beneath the shoulder portion of said wear ring.

9. A sealing mechanism according to claim 7 wherein said means for communicating fluid pressure comprises said wear ring having at least one port at each side of said wear ring extending from adjacent said seating surface portion to said channel along each side thereof and adjacent respectively to each side of said groove, said ports being adapted to communicate said fluid pressure beneath the shoulder portion of said wear ring.

10. A sealing mechanism according to claim 1 wherein said backing ring is comprised of a coil spring having the turns thereof disposed about an axis which extends along the length of the groove.

11. A sealing mechanism according to claim 1 wherein said wear ring is comprised of an elastically deformed metal.

12. A sealing mechanism according to claim 11 wherein said shoulder portion of said wear ring is yieldably and slidably biased against both sides of said groove.

13. A sealing mechanism according to claim 11 wherein said backing ring is comprised of an elastomeric material.

14. A sealing mechanism according to claim 11 wherein said backing ring is comprised of a coil spring having the turns thereof disposed about an axis which extends along the length of the groove.

15. A sealing mechanism according to claim 1 wherein said wear ring is comprised of asbestos.

16. A sealing mechanism according to claim 1 wherein said shoulder portion of said wear ring further comprises at least one stiffening element to stiffen said shoulder portion.

17. A sealing mechanism according to claim 16 wherein at least one of said stiffening elements of said shoulder portion of said wear ring comprises a resilient plate adapted to urge said shoulder portion of said wear ring against the laterally offset sidewalls of said groove.

18. A sealing mechanism according to claim 1 further comprising:
a cushion material disposed between said wear ring and said backing ring within said groove.

19. A sealing mechanism according to claim 18 wherein said cushion material comprises at least one piece of cushion material.

20. A sealing mechanism according to claim 1 wherein said backing ring comprises at least one tensile band coaxial with said wear ring.

21. A sealing mechanism according to claim 10 further comprising:
at least one tensile band coaxial with said coil spring and interior to said spring.

22. A sealing mechanism according to claim 14 further comprising:
at least one tensile band coaxial with said coil spring and interior to said spring.

23. A sealing mechanism according to claim 1 wherein said backing ring is comprised of a finger spring.

24. A sealing mechanism according to claim 1 wherein said wear ring is unsymmetrical with respect to a plane bisecting said wear ring and perpendicular to the seating surface of said wear ring.

25. A sealing mechanism according to claim 24 wherein the seating surface portion of said wear ring is unsymmetrical with respect to a plane bisecting said seating surface and perpendicular to the seating surface of said wear ring.

26. A sealing mechanism according to claim 24 wherein said shoulder portion of said wear ring is unsymmetrical with respect to a plane bisecting said seating surface and perpendicular to the seating surface of said wear ring.

27. A sealing mechanism according to claim 1 further comprising:
at least one metal band adapted to cooperate with said wear ring and to have a portion thereof contiguous with said seating surface portion of said wear ring.

28. A sealing mechanism comprising a plurality of sealing mechanisms according to claim 1 arranged in tandem and provided with means to relieve system pressure from the regions disposed between said plurality of sealing mechanisms.

29. A sealing mechanism according to claim 1 wherein:
said first member comprises a valve body having a chamber, an inlet port and an outlet port connected to said chamber, and a valve seat located in said valve body; and
said second member comprises a sealing element movable with respect to said chamber in said valve body and adapted to permit or to stop the flow of system pressure from the inlet port to the outlet port of said body.

30. A sealing mechanism according to claim 1 wherein:
said second member comprises a valve body having a chamber, an inlet port and an outlet port connected to said chamber, and a valve seat located in said valve body; and
said first member comprises a sealing element movable with respect to said chamber in said valve body and adapted to permit or to stop the flow of system pressure from the inlet port to the outlet port of said body.

31. In a valve to seal against the flow of system pressure including:
a. a valve body having a chamber, said chamber including an inlet port and an outlet port,
b. a valve seat in said valve body,
c. a sealing means movable with respect to said chamber in said valve body and adapted to permit or to stop the flow of system pressure from said inlet port to said outlet port,
d. means to move said sealing means from a position where the flow of system pressure is permitted from the inlet port to the outlet port to a position where system pressure is blocked from flowing from the inlet port to the outlet port and vice versa, the improvement comprising:
1. an elongated groove formed in said valve seat and extending with respect to a surface thereof, the elongated opening of the groove adjacent to the surface being defined by two elongated flanges depending from the opposite sides of said groove and extending toward one another, the width of the opening between the flanges being less than the width of the bottom portion of said groove between said sides thereof;
2. an elongated wear ring disposed in part in said groove and extending along the length thereof, the fit of the wear ring enabling the wear ring to move inwardly and outwardly with respect to said groove, said wear ring having a seating surface portion with a seating surface thereon, said seating surface portion having a width enabling said seating surface portion to extend through the opening, and a shoulder portion movable with respect to said groove and having a width greater than the width of said groove opening, said width enabling said shoulder portion to be abuttable against said groove flanges to retain said wear ring in said groove, the area of the bottom of the shoulder portion facing the bottom portion of the groove being greater than the area of the seating surface, the bottom of said shoulder portion having an elongated channel extending along the length of said wear ring and upwardly into said shoulder portion substantially to said seating surface portion, said channel bifurcating said shoulder portion into two portions, each of which is movable toward or away from the sides of the groove, one portion of said shoulder portion enabling fluid pressure to enter the groove by passing between one side of said groove and said wear ring to urge the other portion of the shoulder portion adjacent the other side of said groove toward the side and flange related thereto;

3. an elongated sealing surface formed on said movable sealing means, said sealing surface being engageable with said wear ring seating surface along the length thereof to close said sealing mechanism against the fluid pressure, the sealing pressure between the sealing surface and the seating surface being greater than the fluid pressure on the bottom of the shoulder portion of said wear ring in response to the greater area thereof as compared to the area of the seating surface of the wear ring; and 4. a backing ring disposed in said groove between the channel of the wear ring and the bottom of the groove, said backing ring urging said wear ring outwardly with respect to said groove and urging said portions of said shoulder portion toward the sides of the groove.

32. In a valve to seal against the flow of system pressure including:

a. a valve body having a chamber said chamber including an inlet port and an outlet port, b. a valve seat in said valve body, c. a sealing means movable with respect to said chamber in said valve body and adapted to permit or to stop the flow of system pressure from said inlet port to said outlet port, d. means to move said sealing means fro a position where the flow of system pressure is permitted from the inlet port to the outlet port to a position where system pressure is blocked from flowing from the inlet port to the outlet port and vice versa, the improvement comprising:

1. an elongated groove formed in said movable sealing means and extending with respect to a surface thereof, the elongated opening of the groove adjacent to the surface being defined by two elongated flanges depending from the opposite sides of said groove and extending toward one another, the width of the opening between the flanges being less than the width of the bottom portion of said groove between said sides thereof;

2. an elongated wear ring disposed in part in said groove and extending along the length thereof, the fit of the wear ring enabling the wear ring to move inwardly and outwardly with respect to said groove, said wear ring having a seating surface portion with a seating surface thereon, said seating surface portion having a width enabling said seating surface portion to extend through the opening, and a shoulder portion movable with respect to said groove and having a width greater than the width of said groove opening, said width enabling said shoulder portion to be abuttable against said groove flanges to retain said wear ring in said groove, the area of the bottom of the shoulder portion facing the bottom portion of the groove being greater than the area of the seating surface, the bottom of said shoulder portion having an elongated channel extending along the length of said wear ring and upwardly into said shoulder portion substantially to said seating surface portion, said channel bifurcating said shoulder portion into two portions, each of which is movable toward or away from the sides of the groove, one portion of said shoulder portion enabling fluid pressure to enter the groove by passing between one side of said groove and said wear ring to urge the other portion of the shoulder portion adjacent the other side of said groove toward the side and flange related thereto;

3. an elongated sealing surface formed on said valve seat, said sealing surface being engageable with said wear ring seating surface along the length thereof to close said sealing mechanism against the fluid pressure, the sealing pressure between the sealing surface and the seating surface being greater than the fluid pressure on the bottom of the shoulder portion of said wear ring in response to the greater area thereof as compared to the area of the seating surface of the wear ring; and 4. a backing ring disposed in said groove between the channel of the wear ring and the bottom of the groove, said backing ring urging said wear ring outwardly with respect to said groove and urging said portions of said shoulder portion toward the sides of the groove.

33. A sealing mechanism according to claim 1 wherein said backing ring is resilient.

34. A sealing mechanism according to claim 1 wherein said backing ring is a resilient spring.

35. A sealing mechanism according to claim 1 wherein the overall width of said portions of said shoulder portion is wider than the width of the bottom portion of said groove when said wear ring is in an unconfined condition, whereby said portions of said shoulder portion are preloaded against the sides of said groove when said wear ring is disposed within said groove.

36. A sealing mechanism according to claim 11 wherein the overall width of said portions of said shoulder portion is wider than the width of the bottom portion of said groove when said wear ring is in an unconfined condition, whereby said portions of said shoulder portion are preloaded against the sides of said groove when said wear ring is disposed within said groove.

37. A sealing mechanism according to claim 1 wherein the concave curvature of said seating surface, with regard to said sealing surface, is slightly greater than the convex curvature of said sealing surface with regard to said seating surface, whereby the upstream and downstream edges of said seating surface may be brought into firm engagement with said sealing surface.

38. A sealing mechanism according to claim 11 wherein the concave curvature of said seating surface, with regard to said sealing surface, is slightly greater than the convex curvature of said sealing surface with regard to said seating surface, whereby the upstream and downstream edges of said seating surface may be brought into firm engagement with said sealing surface.

* * * * *

UNITED STATES PATENT OFFICE
CERTIFICATE OF CORRECTION

Patent No. 3,642,248      Dated February 15, 1972

Inventor(s) Robert Edgar Benware

It is certified that error appears in the above-identified patent and that said Letters Patent are hereby corrected as shown below:

On the cover page "Assignees: Allen & Company FOF Proprietary Funds Ltd.; Robin Harkas; William Stix Wasserman" should be -- Assignee: James D. Bronson, Jr. ("The Investor") --.

On the cover page "Kenyon and Kenyon Reilly Carr & Chapin" should be -- Kenyon & Kenyon Reilly Carr & Chapin --.

In the Abstract, line 1, after "sealing", "machine" should be -- mechanism --.

In the Abstract, line 22, "to" should be -- an --.

Column 5, line 40, after "O-ring" insert -- 118 --.

Column 10, line 41, "projection" should be -- projecting --.

Column 11, line 5, after "upstream" insert -- system --.

Column 21, line 30, "fro" should be -- from --.

Signed and sealed this 15th day of August 1972.

(SEAL)
Attest:

EDWARD M. FLETCHER, JR.          ROBERT GOTTSCHALK
Attesting Officer                Commissioner of Patents